United States Patent
Furuta et al.

(10) Patent No.: US 8,783,777 B2
(45) Date of Patent: Jul. 22, 2014

(54) HEADREST SUPPORT STRUCTURE

(75) Inventors: Masaya Furuta, Shioya-gun (JP);
Takuji Kaneda, Shioya-gun (JP);
Makoto Takeuchi, Shioya-gun (JP)

(73) Assignee: TS Tech Co., Ltd., Asaka (JP)

(*) Notice: Subject to any disclaimer, the term of this patent is extended or adjusted under 35 U.S.C. 154(b) by 231 days.

(21) Appl. No.: 12/811,759

(22) PCT Filed: Jan. 9, 2009

(86) PCT No.: PCT/JP2009/050214
§ 371 (c)(1),
(2), (4) Date: Jul. 6, 2010

(87) PCT Pub. No.: WO2009/088073
PCT Pub. Date: Jul. 16, 2009

(65) Prior Publication Data
US 2010/0276978 A1 Nov. 4, 2010

(30) Foreign Application Priority Data
Jan. 11, 2008 (JP) ................................. 2008-004554

(51) Int. Cl.
*B60N 2/48* (2006.01)
*A47C 7/38* (2006.01)

(52) U.S. Cl.
CPC ....... *B60N 2/4808* (2013.01); *B60N 2002/4897* (2013.01)
USPC .......................................... 297/410; 297/391

(58) Field of Classification Search
CPC ...................... B60N 2/4808; B60N 2002/4897
USPC ...................................... 297/410, 463.1, 391
See application file for complete search history.

(56) References Cited

U.S. PATENT DOCUMENTS

| | | | |
|---|---|---|---|
| 4,854,642 A | 8/1989 | Vidwans et al. | |
| 5,667,276 A * | 9/1997 | Connelly et al. | 297/410 |

(Continued)

FOREIGN PATENT DOCUMENTS

| | | |
|---|---|---|
| JP | U 60-60954 | 4/1985 |
| JP | U-63-025043 | 2/1988 |

(Continued)

OTHER PUBLICATIONS

Extended Search Report issued in European Application No. 09 70 0215 dated Mar. 1, 2011.

(Continued)

*Primary Examiner* — Milton Nelson, Jr.
(74) *Attorney, Agent, or Firm* — Oliff PLC

(57) ABSTRACT

It is to suppress the deformation of a tubular support. A headrest support structure includes: a stay extending downward from a headrest; a bracket provided to a backrest so as to be formed in a tubular shape, and extending vertically; a tubular portion having an insertion hole in which the stay is inserted, the tubular portion being fitted into the bracket, and extending vertically; a first projection portion projecting from an outer peripheral surface of an upper part of the tubular portion, and facing to an inner surface of the bracket; a second projection portion projecting from the outer peripheral surface of a middle part in an up-and-down direction of the tubular portion, and facing to the inner surface of the bracket; a third projection portion projecting from the outer peripheral surface of a lower part of the tubular portion, and facing to the inner surface of the bracket; a first connection portion located between the first projection portion and the second projection portion; and a second connection portion located between the second projection portion and the third projection portion.

17 Claims, 25 Drawing Sheets

(56) References Cited

U.S. PATENT DOCUMENTS

| | | | |
|---|---|---|---|
| 5,788,250 A * | 8/1998 | Masters et al. | 297/410 |
| 5,816,658 A * | 10/1998 | Wallis | 297/410 |
| 6,454,356 B1 * | 9/2002 | Yamada | 297/410 |
| 6,761,409 B2 * | 7/2004 | Ford | 297/410 |
| 2004/0090103 A1 | 5/2004 | Yamada | |

FOREIGN PATENT DOCUMENTS

| | | |
|---|---|---|
| JP | U-64-21650 | 2/1989 |
| JP | U-02-141242 | 11/1990 |
| JP | U-05-076350 | 10/1993 |
| JP | A 2000-102444 | 4/2000 |
| JP | B2 3475320 | 12/2003 |
| JP | A 2004-57462 | 2/2004 |

OTHER PUBLICATIONS

Jun. 4, 2012 Chinese Office Action issued in Chinese Application No. 200980101949.8 with English-language translation.

Nov. 6, 2012 Notification of Reasons for Refusal issued in Japanese Patent Application No. 2009-063070 (with translation).

Feb. 28, 2013 Office Action issued in Chinese Patent Application No. 200980101949.8 (with translation).

Aug. 6, 2013 Notification of Reasons for Refusal issued in Japanese Patent Application No. 2009-003565 (with translation).

Mar. 4, 2014 Office Action issued in Japanese Patent Application No, 2009-003565 w/translation.

* cited by examiner

HEADREST SUPPORT STRUCTURE

TECHNICAL FIELD

The present invention relates to a headrest support structure for supporting a headrest.

BACKGROUND ART

Conventionally, a headrest is provided in a vehicle seat, and an occupant can support his or her own head on the headrest. The headrest is provided at the upper end of a backrest, and the headrest is supported by a support structure. For example, as described in Japanese Patent No. 3475320, a tubular bracket (support receiver 3) is fixated to the frame of a backrest, and a tubular support (2) is fit into the bracket from the upper part of the bracket. Furthermore, a stay (1a) extending from a headrest (1) downward is inserted into the support (2).
[Patent Publication 1]: Japanese Patent No. 3475320

DISCLOSURE OF THE INVENTION

Problems to be Solved by the Invention

Now, when an occupant rests the back part of the head against a headrest, a load is applied to the support from the stay, and it is apprehended that the support is deformed.

It is accordingly an object of the present invention to suppress the deformation of the tubular support.

Means for Solving the Problems

In order to solve the problem mentioned above, according to embodiments, a headrest support structure comprises: a stay extending downward from a headrest; a bracket provided to a backrest so as to be formed in a tubular shape, and extending vertically; a tubular portion having an insertion hole in which the stay is inserted, the tubular portion being fitted into the bracket, and extending vertically; a first projection portion projecting from an outer peripheral surface of an upper part of the tubular portion, and facing to an inner surface of the bracket; a second projection portion projecting from the outer peripheral surface of a middle part in an up-and-down direction of the tubular portion, and facing to the inner surface of the bracket; a third projection portion projecting from the outer peripheral surface of a lower part of the tubular portion, and facing to the inner surface of the bracket; a first connection portion located between the first projection portion and the second projection portion; and a second connection portion located between the second projection portion and the third projection portion.

According to embodiments, a headrest support structure comprises: a stay extending downward from a headrest; a bracket provided to a backrest so as to be formed in a tubular shape, and extending vertically; a tubular portion having an insertion hole in which the stay is inserted, the tubular portion being fitted into the bracket, and extending vertically; a first projection portion projecting from an outer peripheral surface of the tubular portion, and facing to an inner surface of the bracket; a second projection portion projecting from the outer peripheral surface of the tubular portion and provided lower than the first projection portion, the second projection facing to the inner surface of the bracket; and a connection portion located between the first projection portion and the second projection portion.

According to embodiments, the headrest support structure further comprises: a second connection portion located between the first projection portion and the second projection portion, and arranged to a left side of the connection portion; and a third connection portion located between the first projection portion and the second projection portion, and arranged to a right side of the connection portion.

According to embodiments, a headrest support structure comprises: a stay extending downward from a headrest; a bracket provided to a backrest so as to be formed in a tubular shape, and extending vertically; a tubular portion having an insertion hole in which the stay is inserted, the tubular portion being fitted into the bracket, and extending vertically; and a plurality of projection portions projecting from an outer peripheral surface of the tubular portion so as to arrange the projection portions in an up-and-down direction, and facing to an inner surface of the bracket, wherein an interval between adjacent projection portions arranged at a middle part in the up-and-down direction of the tubular portion among the plurality of projection portions is smaller than an interval between other adjacent projection portions.

According to embodiments, a headrest support structure comprises: a stay extending downward from a headrest; a bracket provided to a backrest so as to be formed in a tubular shape, and extending vertically; a tubular portion having an insertion hole in which the stay is inserted, the tubular portion being fitted into the bracket, and extending vertically; and a plurality of projection portions projecting from an outer peripheral surface of the tubular portion so as to arrange the projection portions in an up-and-down direction, and facing to an inner surface of the bracket, wherein a projection portion arranged at a middle part in the up-and-down direction of the tubular portion among the plurality of projection portions is longer in the up-and-down direction than another projection portion.

According to embodiments, a headrest support structure comprises: a stay extending downward from a headrest; a bracket provided to a backrest so as to be formed in a tubular shape, and extending vertically; a tubular portion having an insertion hole in which the stay is inserted, the tubular portion being fitted into the bracket, and extending vertically; and a plurality of projection portions projecting from an outer peripheral surface of the tubular portion so as to arrange the projection portions in an up-and-down direction, and facing to an inner surface of the bracket, wherein a projection portion arranged at a middle part in the up-and-down direction of the tubular portion among the plurality of projection portions is longer in a right-and-left direction than another projection portion.

According to embodiments, the headrest support structure further comprises: a plurality of connection portions located between the plurality of projection portions.

According to embodiments, a connection portion arranged at a middle part in the up-and-down direction of the tubular portion among the plurality of connection portions is wider in a right-and-left direction than another connection portion.

According to embodiments, a hole or a concavity part is formed between the connection portion and the outer peripheral surface of the tubular portion.

According to embodiments, the projection portions and the connection portion are provided to be flush with each other.

According to embodiments, an opening is formed in the tubular portion on an opposite side of the projection portions, and the projection portions are formed to an edge of the opening along the outer peripheral surface of the tubular portion.

According to embodiments, the projection portions are provided so as to form a fin shape.

According to embodiments, a headrest support structure comprises: a stay extending downward from a headrest; a bracket provided to a backrest so as to be formed in a tubular shape, and extending vertically; a tubular portion having an insertion hole in which the stay is inserted, the tubular portion being fitted into the bracket, and extending vertically; and a projection portion projecting from an outer peripheral surface of an upper part of the tubular portion, and facing to an inner surface of the bracket; wherein an opening is formed in the tubular portion on an opposite side of the projection portion, and a position in an up-and-down direction of the projection portion corresponds to a position in the up-and-down direction of the opening.

According to embodiments, the headrest support structure further comprises a pushing portion which is fit into the opening and which pushes the stay forward.

According to embodiments, a headrest support structure comprises: a stay extending downward from a headrest; a bracket provided to a backrest so as to be formed in a tubular shape, and extending vertically; a tubular portion having an insertion hole in which the stay is inserted, the tubular portion being fitted into the bracket, and extending vertically; a plurality of projection portions projecting from an outer peripheral surface of the tubular portion so as to arrange the projection portions in an up-and-down direction, and facing to an inner surface of the bracket; and a plurality of connection portions located between the plurality of projection portions, wherein a connection portion arranged at a middle part in the up-and-down direction of the tubular portion among the plurality of connection portions is wider in a right-and-left direction than another connection portion.

Effects of the Invention

According to embodiments, the rigidity of the tubular portion is improved by the first to third projection portions. Moreover, the rigidities of the first to third projection portions are improved by the first and second connection portion. It is hereby possible to suppress the deformation of the tubular portion.

According to embodiments, the rigidity of the tubular portion is improved by the first and second projection portions. Moreover, the rigidities of the first and second projection portions are improved by the connection portion. It is hereby possible to suppress the deformation of the tubular portion.

According to embodiments, the rigidities of the first and second projection portions are further improved by locating the second and third connection portions between the first and second projection portions.

According to embodiments, the rigidity of the tubular portion is improved by the plurality of projection portions. In particular, even if the stay is pressed against the inner surface of the tubular portion at the middle part in the up-and-down direction of the tubular portion, the deformation of the tubular portion can efficiently be suppressed because the interval between the adjacent projection portions arranged at the middle part in the up-and-down direction of the tubular portion among the plurality of projection portions is smaller than the intervals between other adjacent projection portions.

According to embodiments, the rigidity of the tubular portion is improved by the plurality of projection portions. In particular, even the stay is pressed against the inner surface of the tubular portion at the middle part in the up-and-down direction of the tubular portion, the deformation of the tubular portion can efficiently be suppressed because the projection portion arranged at the middle part in the up-and-down direction of the tubular portion among the plurality of projection portions is longer in the up-and-down direction than another projection portion.

According to embodiments, the rigidity of the tubular portion is improved by the plurality of projection portions. The deformation of the tubular portion can hereby be suppressed. In particular, even if the stay is pressed against the inner surface of the tubular portion at the middle part in the up-and-down direction of the tubular portion, the deformation of the tubular portion can efficiently be suppressed because the projection portion arranged at the middle part in the up-and-down direction of the tubular portion among the plurality of projection portions is wider in the right-and-left direction than another projection portion.

According to embodiments, because the plurality of connection portions are located between the plurality of projection portions, the rigidities of these projection portions are consequently improved.

According to embodiments, even if the stay is pressed against the inner surface of the tubular portion at the middle part in the up-and-down direction of the tubular portion, the deformation of the tubular portion can efficiently be suppressed because the connection portion arranged at the middle part in the up-and-down direction of the tubular portion among the plurality of connection portions is wider in the right-and-left direction than another connection portion.

According to embodiments, by forming the hole or the concavity part between the connection portion and the outer peripheral surface of the tubular portion, the rigidity of the tubular portion can consequently be secured while the weight saving of the headrest support structure can be achieved by suppressing the increase in quantity of the raw materials of the moldings of the tubular portion and the like.

According to embodiments, because the projection portions and the connection portions are flush with each other and are made to be flat, it is consequently easy to insert the tubular portion into the bracket. Then, the assembly of the headrest support structure can be made good.

According to embodiments, even if the opening is formed in the tubular portion, the lowering of the rigidity of the tubular portion can be suppressed by the projection portions.

According to embodiments, the projection portions can be made to be thin, and it is possible to save the weight of them.

According to embodiments, the rigidity of the tubular portion is improved by the projection portion. In particular, even if the opening is formed on the rear side of the outer peripheral surface of the tubular portion, the tubular portion can be reinforced by the projection portion. The deformation of the tubular portion can hereby be suppressed.

According to embodiments, the stay can be supported by the pushing portion.

According to embodiments, the rigidity of the tubular portion is improved by the plurality of projection portions. Moreover, the rigidities of the plurality of projection portions are improved by the plurality of connection portions. The deformation of the tubular portion can hereby be suppressed. In particular, even if the stay is pressed against the inner surface of the tubular portion at the middle part in the up-and-down direction of the tubular portion, the connection portion arranged at the middle part in the up-and-down direction of the tubular portion among the plurality of connection portions is wider in the right-and-left direction than another connection portion.

Figure 1:
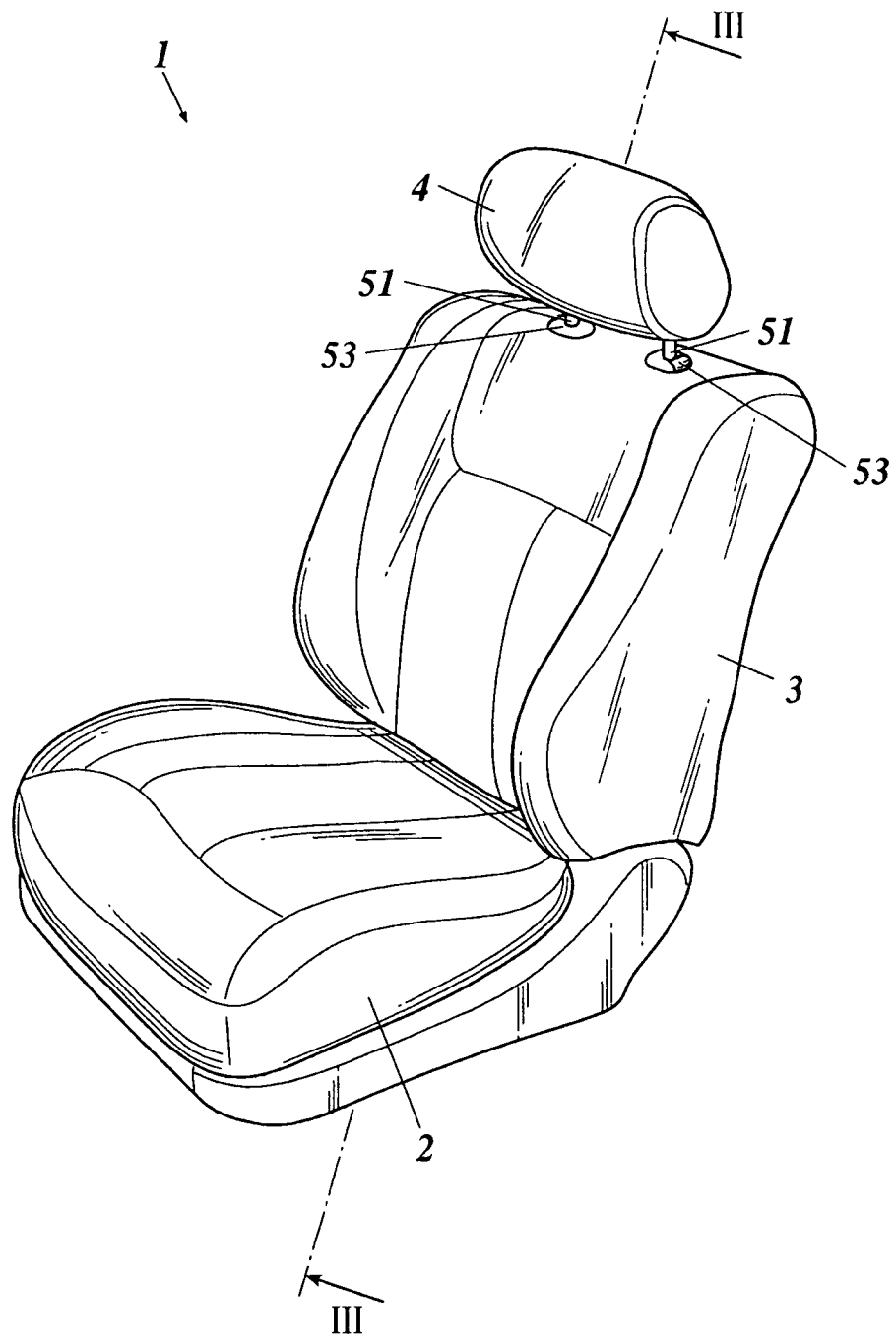
FIG. 1 This is a perspective view showing the vehicle seat in an embodiment of the present invention.

REFERENCE NUMERALS 1 vehicle seat
3 backrest
4 headrest
51 stay
53 stay support
55 bracket
61 tubular portion
62 head
66 insertion hole
68 grip portion
69 opening
70, 73, 74, 81 pushing piece
80 slit
101-111 projection portion
131-140, 131a-140a, 131b-140b connection portion
131c, 136c connection portion
151 hole portion
153a, 153b concavity part

BEST MODE FOR CARRYING OUT THE INVENTION

In the following, preferable modes for carrying out the present invention will be described with reference to the accompanying drawings. Although technically preferable various limitations are added to the embodiments described below in order to carry out the present invention, the scope of the invention is not limited to the following embodiments and shown examples.

First Embodiment

Figure 2:
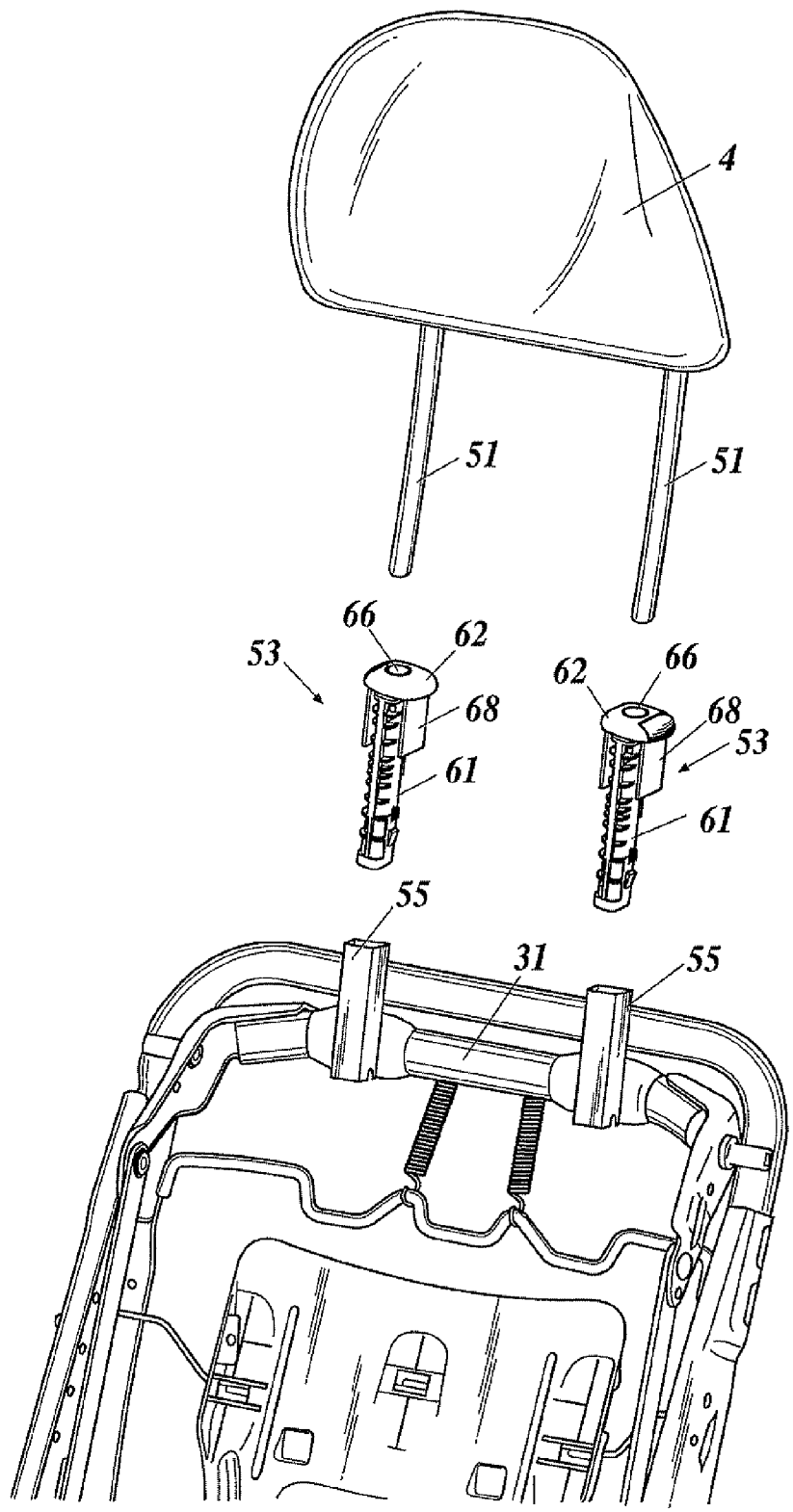
FIG. 2 This is an exploded perspective view showing the exploded support structure of the headrest in the same embodiment.
Figure 3:
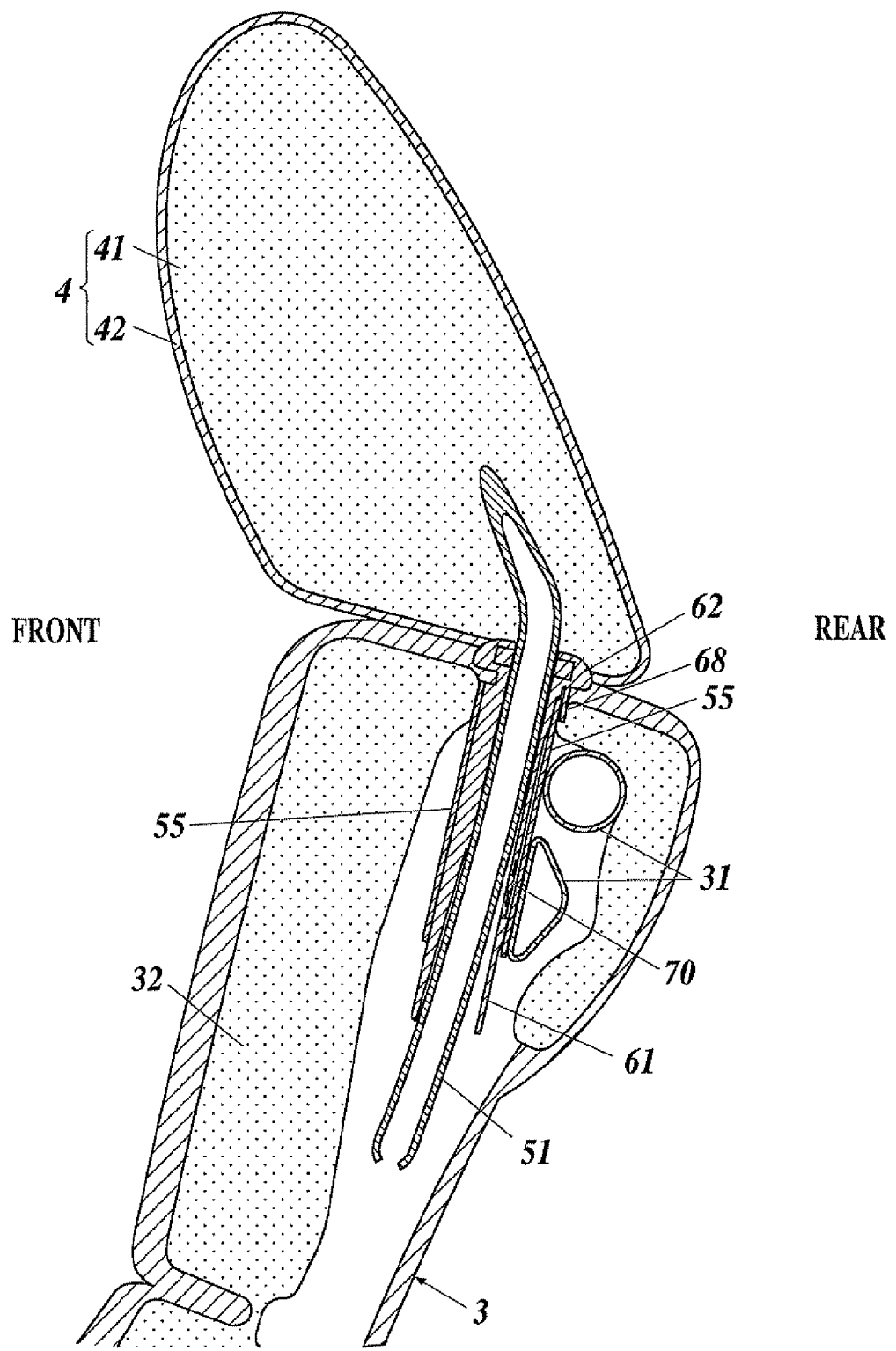
FIG. 3 This is a longitudinal cross sectional view showing the upper part of the backrest, the headrest, and the support structure therefor of the vehicle seat along the line III-III shown in FIG. 1 as viewed from the direction of the arrows in the same embodiment.

FIG. 1 is as perspective view showing a vehicle seat 1. FIG. 2 is an exploded perspective view showing the exploded headrest support structure in the vehicle seat 1. FIG. 3 is a longitudinal cross sectional view of the upper part of a backrest 3, a headrest 4, and the support structure thereof in the vehicle seat 1.

As shown in these drawings, the vehicle seat 1 comprises a seat section 2, the backrest 3 joined to the rear end part of the seat section 2, and the headrest 4 provided at the upper part of the backrest 3.

The seat section 2 is joined to the floor of a vehicle through a fore and aft position adjustment mechanism and a height adjustment mechanism. The fore and aft position of the seat section 2 is adjusted with the position adjustment mechanism. Furthermore, the height of the seat section 2 is adjusted with the height adjustment mechanism. Incidentally, publicly known conventional mechanisms can be used as the position adjustment mechanism and the height adjustment mechanism.

The seat section 2 is composed of a frame with a cushion covering the frame, and receives the buttocks and the femora of an occupant by the lower parts to support the buttocks and the femora. The backrest 3 is joined to the rear end part of the seat section 2 through a reclining mechanism. The reclining mechanism is one for adjusting the angle of the backrest 3 for the seat section 2. The backrest 3 falls backward, rises forward, and is locked to keep the angle at that time with the reclining mechanism. The backrest 3 comprises a frame 31 and a cushion 32 covering the frame 31. The headrest 4 comprises a pad section 41 and a skin 42 covering the pad section 41. The headrest 4 supports the head of an occupant by receiving the back part of the head of the occupant at the rear thereof.

The vehicle seat 1 is provided with a support structure supporting the headrest 4 on the backrest 3. In the following, the support structure of the headrest 4 will be concretely described.

The support structure of the headrest 4 comprises a stay 51 extending from the headrest 4 downward, a stay support 53 receiving the stay 51 to hold the stay 51, and a bracket 55 to hold the stay support 53. The stay 51, the stay support 53, and the bracket 55 are formed as a set, and there are two sets of them on the right side and the left side, respectively.

Figure 4:
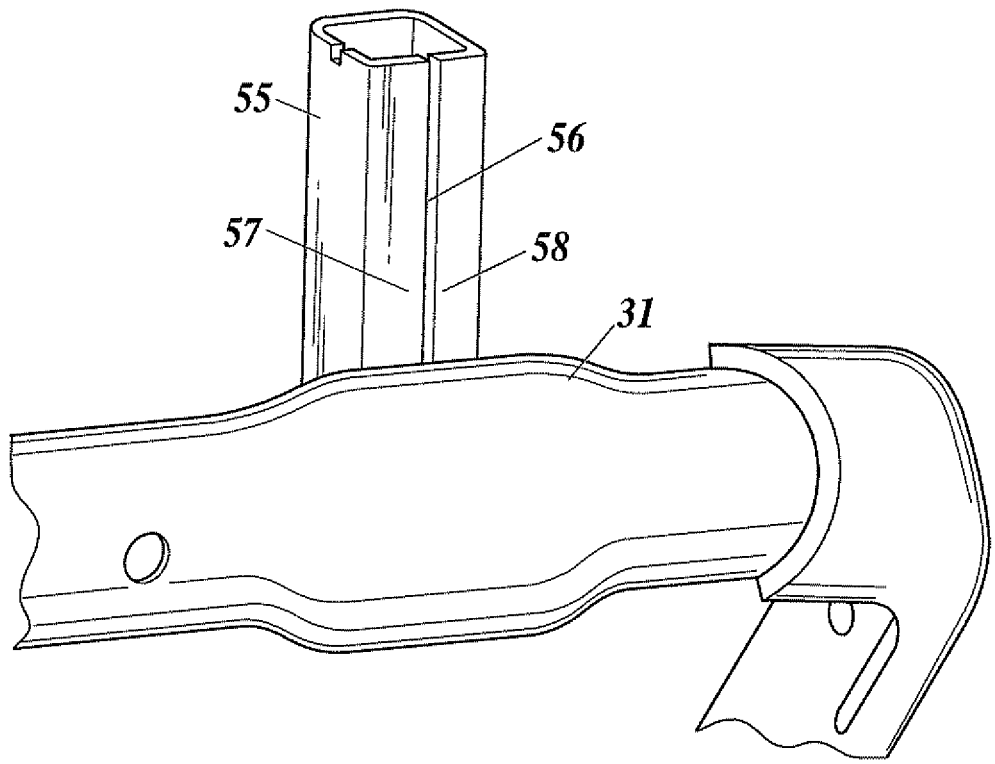
FIG. 4 This is a perspective view showing a frame of the backrest in the same embodiment and a bracket attached thereto.

FIG. 4 is a perspective view mainly showing the back surface side of the frame 31 and the bracket 55 of the backrest 3. As shown in FIG. 4, the bracket 55 is shaped in a rectangular tube, and a slit 56 is formed in the vertical direction from the upper end to the lower end of the back surface of the bracket 55. To put it concretely, the bracket 55 is formed by winding a metal plate into a rectangular tube by bending, and both the end portions 57 and 58 of the metal plate are apart from each other. Therefore, the slit 56 is formed.

Incidentally, both the end portions 57 and 58 of the metal plate may overlap with each other rearward and forward. In this case, both the end portions 57 and 58 are not fixated, and a slight gap between both the end portions 57 and 58 forms the slit. Moreover, both the end portions 57 and 58 of the metal plate may be placed opposite to each other to abut against each other. In this case, both the end portions 57 and 58 are not fixated.

The bracket 55 is fixed at the upper part of the frame 31 in the upper side of the inner part of the backrest 3, and the bracket 55 vertically extend portions in the inner part of the backrest 3. To put it concretely, the back surface of the lower part of the bracket 55 is joined to the front surface of the upper part of the frame 31 by welding or the like.

Figure 5:
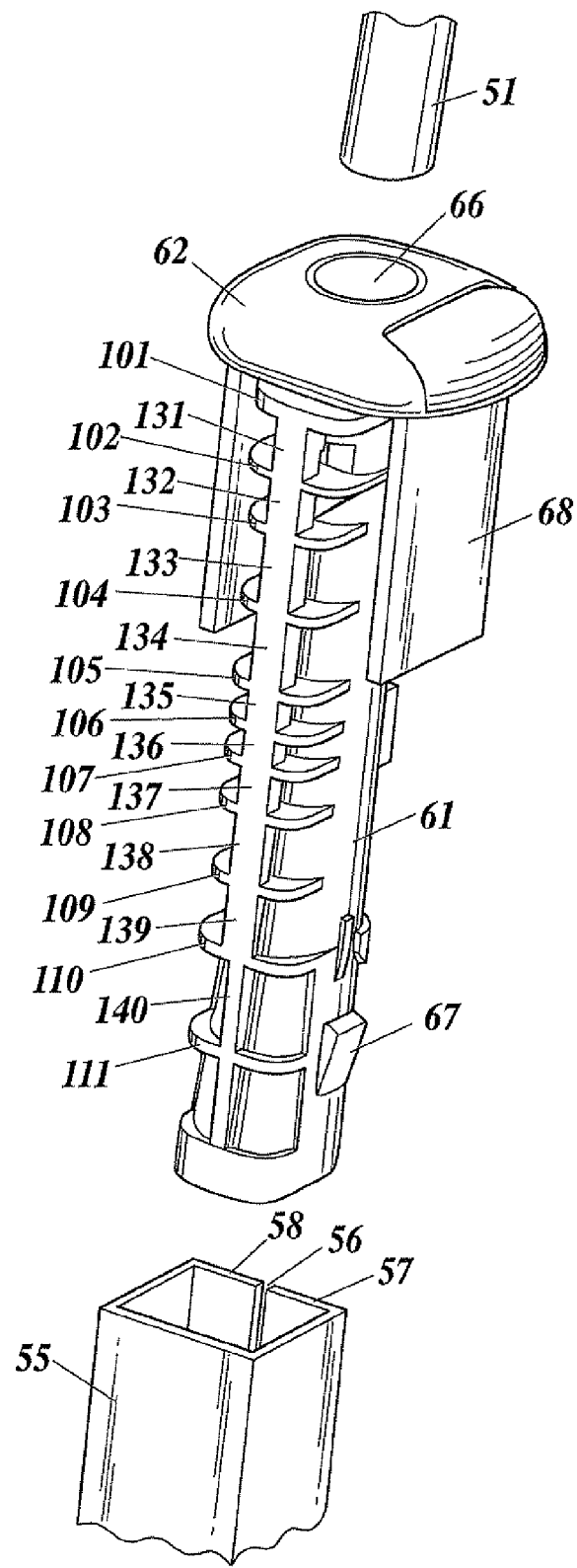
FIG. 5 This is an exploded perspective view of the support structure for the headrest in the same embodiment.
Figure 6:
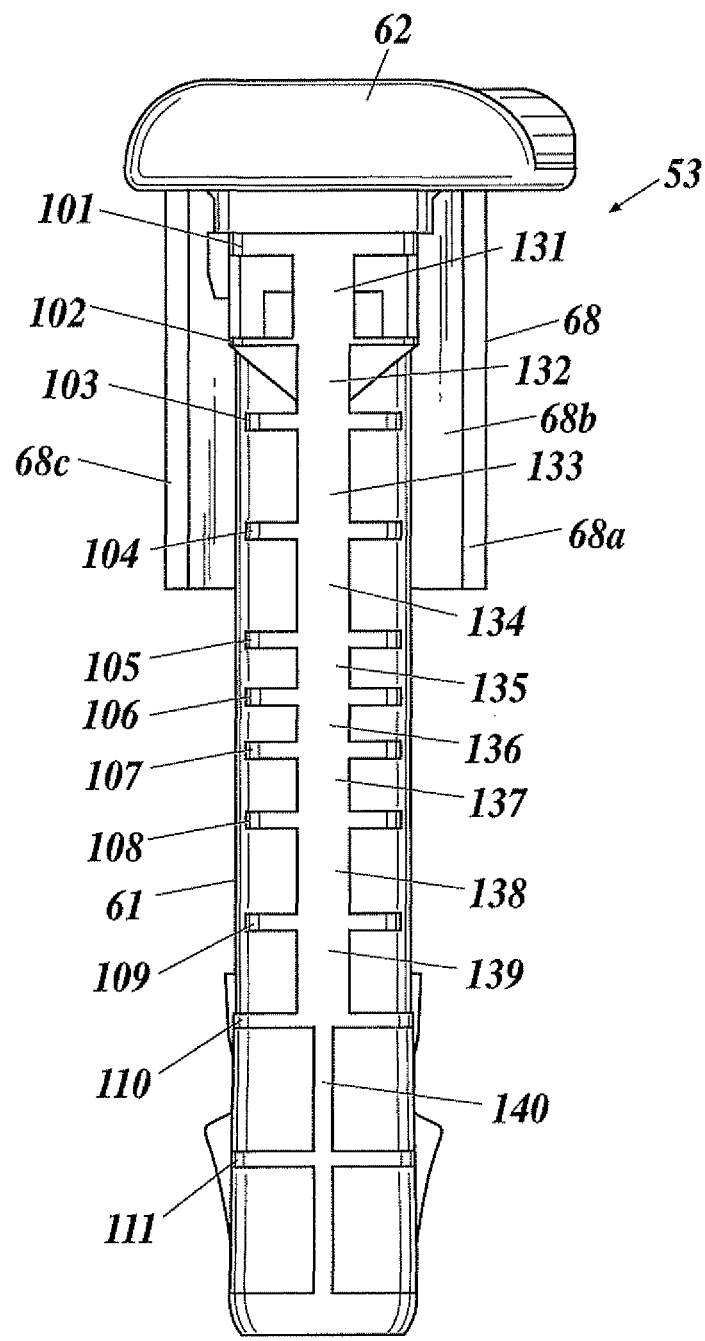
FIG. 6 This is a front view of the stay support in the same embodiment.
Figure 7:
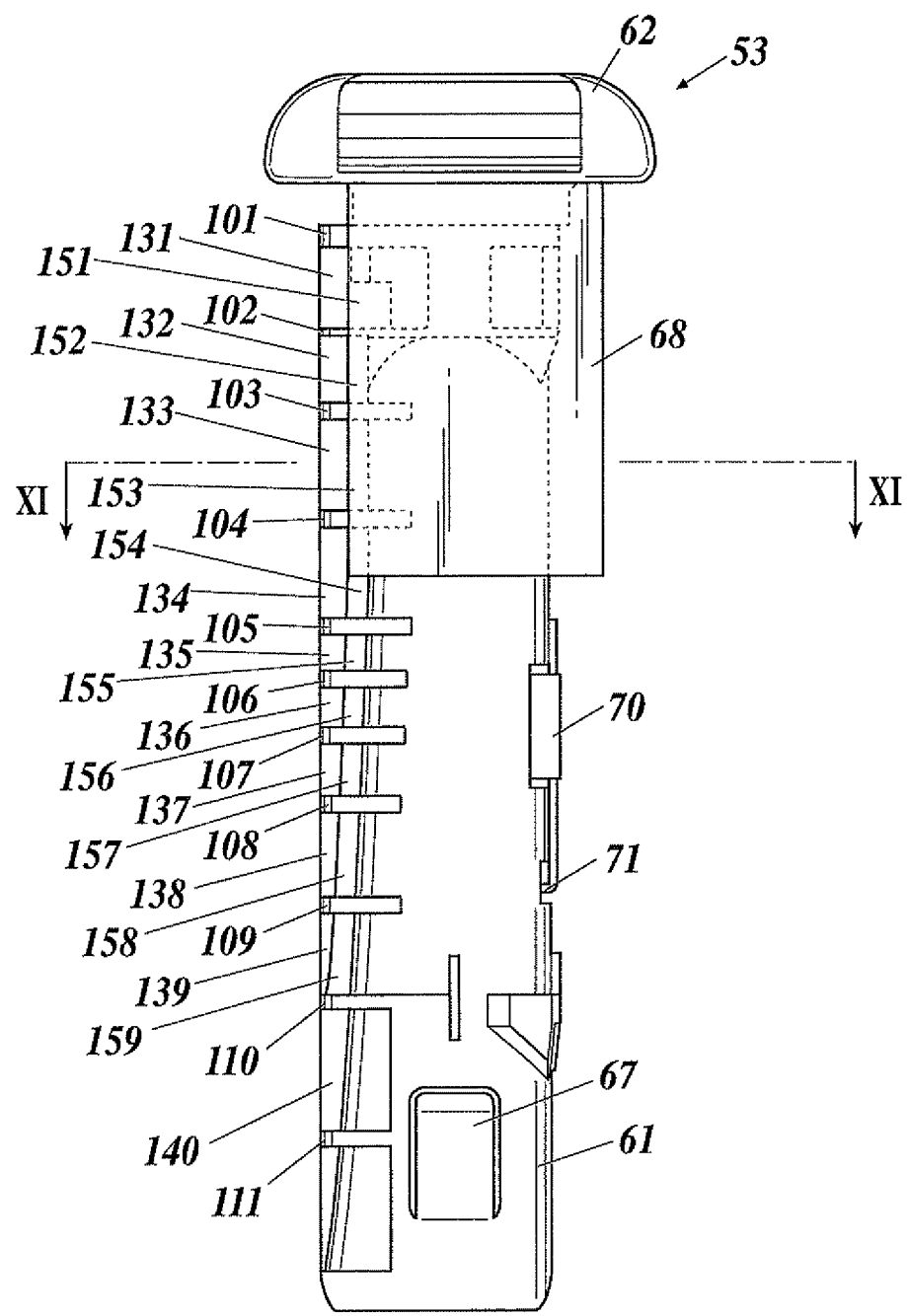
FIG. 7 This is a side view of the stay support in the same embodiment.
Figure 8:
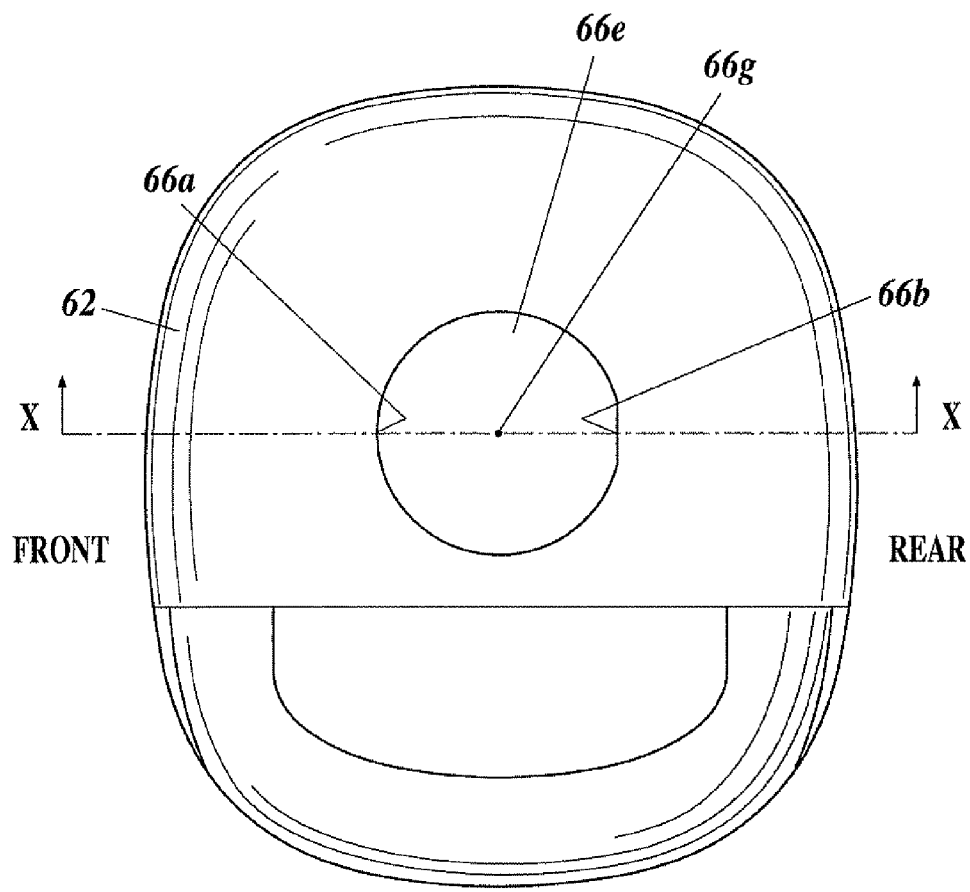
FIG. 8 This is an end elevation view of the upper surface of the stay support in the same embodiment.
Figure 9:
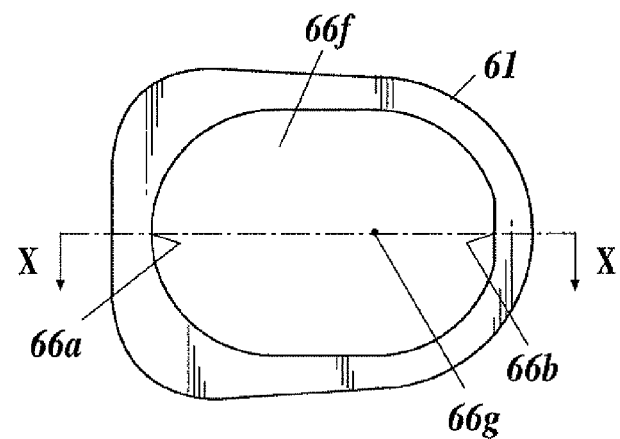
FIG. 9 This is an end elevation view of the lower surface of the stay support in the same embodiment.
Figure 10:
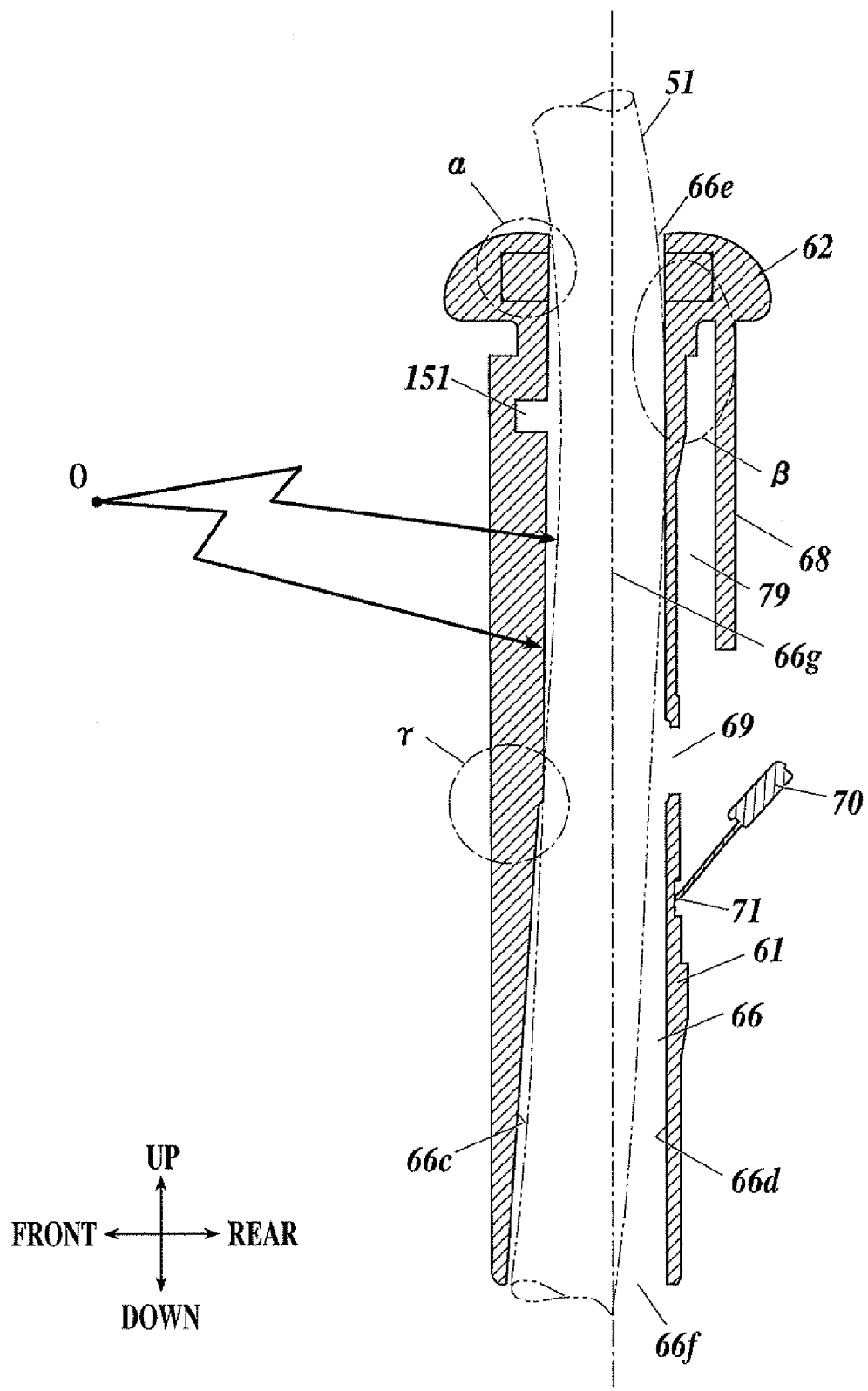
FIG. 10 This is a sectional view of the surface along the line X-X shown in FIG. 8 as viewed from the direction of the arrows.
Figure 11:
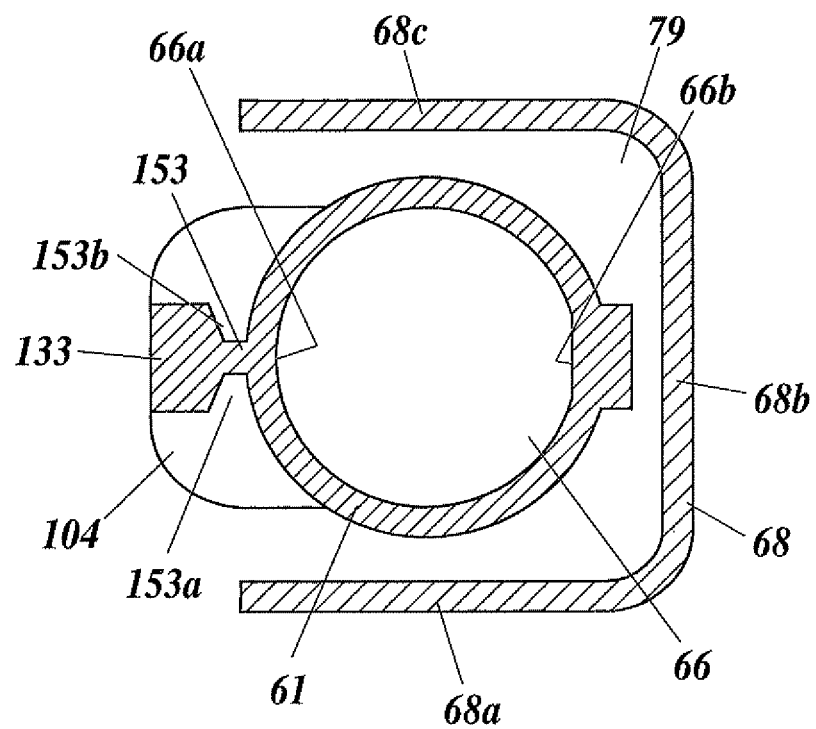
FIG. 11 This is a sectional view of the surface along the line XI-XI shown in FIG. 7 as viewed from the direction of the arrows.

FIG. 5 is an exploded perspective view showing the support structure of the headrest 4 in the state in which the stay support 53 is taken off from the bracket 55 and the state in which the stay 51 is taken off the stay support 53. FIG. 6 is a front view of the stay support 53; FIG. 7 is a side view of the stay support 53; FIG. 8 is a end elevation view of the top surface of the stay support 53; FIG. 9 is the end elevation view of the under surface of the stay support 53; FIG. 10 is a longitudinal cross sectional view of the stay support 53; and FIG. 11 is a cross sectional view of the stay support 53.

The stay support 53 is a molded article formed of a synthetic resin into a tube. The stay support 53 includes a head 62, a tubular portion 61 suspending from the head 62, a grip portion 68 suspending from the head 62 at the circumference of the tubular portion 61, projection portions 101 to 111 projecting from the front surface of the tubular portion 61, connection portions 131 to 140 provided between the projection portions 101 to 111, and pawls 67 provided on the lower part side surface of the tubular portion 61. The tubular portion 61, the head 62, the projection portions 101 to 111, the connection portions 131-140, the pawls 67, and the grip portion 68 are integrally molded with a synthetic resin.

An insertion hole 66 is formed in the stay support 53 over the total length thereof. That is, the insertion hole 66 penetrates the stay support 53 from the upper end surface of the head 62 to the lower end of the tubular portion 61. The upper end opening 66e of the insertion hole 66 is formed in almost a circle, and the lower end opening 66f of the insertion hole 66 is formed in an ellipse which is elongated in the front-and-rear direction. The diameter (major axis) in front-and-rear direction of the insertion hole 66 increases gradually from the top to the bottom thereof, and the diameter (minor axis) in right-and-left direction of the insertion hole 66 is equal from the top to the bottom thereof. The line 66d (shown in FIG. 10) drawn by the rear side wall surface 66b of the insertion hole 66 in the longitudinal cross section thereof does not curve and is a straight line. The line 66d drawn by the rear side wall surface 66b of the insertion hole 66 in the longitudinal cross section is parallel to the center line 66g passing the center of the upper end opening 66e of the insertion hole 66.

On the other hand, the line 66c (shown in FIG. 10) drawn by the front side wall surface 66a of the insertion hole 66 in the longitudinal cross section curves in an arch, and the center of curvature O of the line 66c exists before the insertion hole 66. Incidentally, although the line 66d drawn by the rear side wall surface 66b of the insertion hole 66 in the longitudinal cross section may curve in an arch and the center of curvature may exist before the insertion hole 66, it is necessary that the radius of curvature of the line 66d is larger than that of the line 66c of the front side wall surface 66a in that case. Then, if the radius of curvature of the line 66d of the rear side wall surface 66b of the insertion hole 66 is infinite, it is resulted that the radius of curvature of the line 66d is larger than the radius of curvature of the line 66c of the front side wall surface 66a, and that the line 66d is a straight line as described above.

Figure 12:
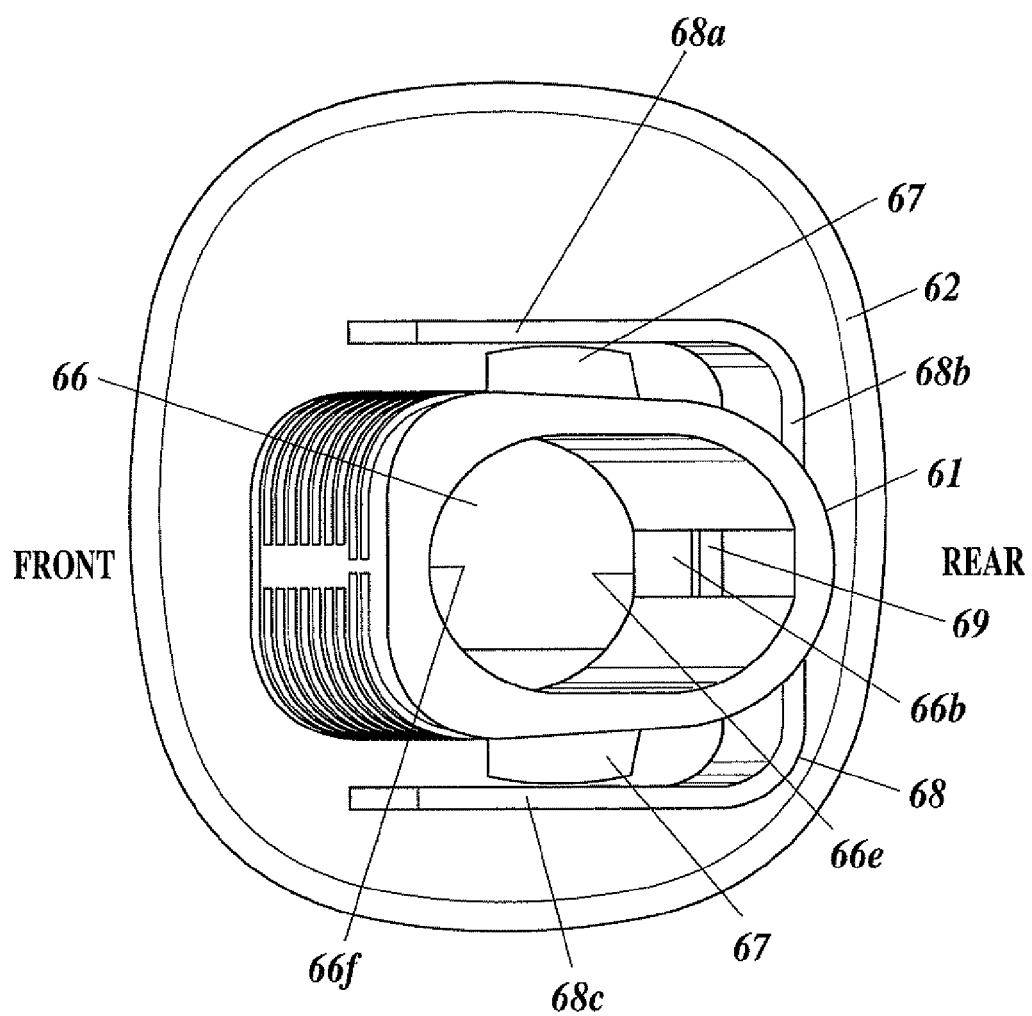
FIG. 12 This is a bottom view of the stay support in the same embodiment.

FIG. 12 is a bottom view showing the stay support 53. In FIG. 12, the center line 66g is not perpendicular to the paper surface but is shown to slightly incline from the perpendicular direction to the paper surface, as the rear side wall surface 66b of the insertion hole 66 may be shown. As shown in FIG. 12, the rear side wall surface 66b of the insertion hole 66 is not formed in a column surface, but is formed in a flat surface. The flat rear side wall surface 66b is formed in a belt from the upper end opening 66e of the insertion hole 66 to the lower end opening 66f thereof.

As shown in FIGS. 11 and 12, the shape of the cross section of the grip portion 68 is a U shape or a C shape, which is opened in the front side thereof. That is, the grip portion 68 includes a pair of side wall parts 68a and 68c on both sides thereof and a rear wall part 68b ranging from the rear ends of the side wall parts 68a and 68c. Moreover, as shown in FIGS. 5, 6, 7, and 11, wall parts 68a, 68b, and 68c ranges to the head 62 at their upper ends. The wall parts 68a, 68b, and 68c are separated from the tubular portion 61, and a gap 79 exists between the outer surface of the tubular portion 61 and the inner surface of the grip portion 68.

As shown in FIGS. 5 to 7, the projection portions 101 to 111 are formed on the front surface of the tubular portion 61. These projection portions 101 to 111 are provided in a fin shape (thin plate shape), and are provided perpendicular to the center line 66g passing the center of the upper end opening 66e of the insertion hole 66. Because the projection portions 101 to 111 are provided in the fin shape, the thinning of the projection portions 101 to 111 can be achieved, and the weight saving of the stay supports 53 is enabled.

These projection portions 101 to 111 are arranged in the up-and-down direction. The intervals between the adjacent projection portions 101 to 104 which are arranged in the upper part of the tubular portion 61, are wider than those between the adjacent projection portions 105 to 108 which are arranged at the middle part in the up-and-down direction of the tubular portion 61. Moreover, the intervals between the adjacent projection portions 109 to 111 which are arranged in the lower part of the tubular portion 61, are wider than those between the adjacent projection portions 105 to 108 which are arranged at the middle part in the up-and-down direction of the tubular portion 61. Furthermore, the interval between the projection portion 104 and the projection portion 105 and the interval between the projection portion 108 and the projection portion 109 are wider those between the adjacent projection portions 105 to 108 which are arranged at the middle part in the up-and-down direction of the tubular portion 61.

The connection portion 131 is located between the projection portion 101 and the projection portion 102, and the upper end of the connection portion 131 joins to the projection portion 101. The upper end of the connection portion 131 joins to the projection portion 101. The interval between the projection portions 101 and 102 is held by the connection portion 131.

The connection portion 131 is wider in the right-and-left direction than the projection portions 101 and 102. The connection portion 131 is linked to the projection portion 101 at the middle part in the right-and-left direction of the projection portion 101, and is linked to the projection portion 102 at the central part in the right-and-left direction of the projection portion 102.

The front end surface of the connection portion 131, the front end surface of the projection portion 101, and the front end surface of the projection portion 102 are uniform, and these surfaces are flush with one another.

The connection portion 132 is similarly located between the projection portion 102 and the projection portion 103; the connection portion 133 is located between the projection portion 103 and the projection portion 104; the connection portion 134 is located between the projection portion 104 and the projection portion 105; the connection portion 135 is located between the projection portion 105 and the projection portion 106; the connection portion 136 is located between the projection portion 106 and the projection portion 107; the connection portion 137 is located between the projection portion 107 and the projection portion 108; the connection portion 138 is located between the projection portion 108 and the projection portion 109; the connection portion 139 is located between the projection portion 109 and the projection portion 110; and the connection portion 140 is located between the projection portion 110 and the projection portion 111. These connection portions 131 to 140 range in the vertical direction to be in a belt. The connection portions 131 to 140, the projection portions 101 to 111, and the tubular portion 61 are together integrally molded.

The widths in the right-and-left direction of the connection portions 131 to 139 are equal to one another. Moreover, the width of the connection portion 140 is smaller in the right-and-left direction than those of the connection portions 131 to 139. Incidentally, the width in the right-and-left direction of the connection portion 140 may be equal to those of the connection portions 131 to 139.

As shown in FIG. 7, the connection portion 131 is separated from the front surface of the tubular portion 61, and a hole 151 is formed between the connection portion 131 and the front surface of the tubular portion 61. The hole 151 penetrates in the right-and-left direction.

As shown in FIGS. 7 and 11, the connection portion 133 is separated from the front surface of the tubular portion 61, and a partition wall 153 is formed between the connection portion 133 and the front surface of the tubular portion 61. The part enclosed by the connection portion 133 and the projection portions 133 and 134 is obstructed with the partition wall 153. The thickness (the length in the right-and-left direction) of the partition wall 153 is smaller than the width in the right-and-left direction of the connection portion 133, and the combination of the connection portion 133 and the partition wall 153 is formed in the shape of the cross section of T, and concavity parts 153a and 153b are formed on both sides of the partition wall 153. Because the concavity parts 153a and 153b are formed on both sides of the partition wall 153, the rigidity of the stay support 53 can be secured with the weight saving thereof achieved by suppressing the increase of the quantity of the raw material (resin) at the time of molding the stay support 53.

A partition wall 152 is similarly formed between the connection portion 132 and the front surface of the tubular portion 61; a partition wall 154 is formed between the connection portion 134 and the front surface of the tubular portion 61; a partition wall 155 is formed between the connection portion 135 and the front surface of the tubular portion 61; a partition wall 156 is formed between the connection portion 136 and the front surface of the tubular portion 61; a partition wall 157 is formed between the connection portion 137 and the front surface of the tubular portion 61; a partition wall 158 is formed between the connection portion 138 and the front surface of the tubular portion 61; and a partition wall 159 is formed between the connection portion 139 and the front surface of the tubular portion 61. Incidentally, a hole may be formed between the connection portion 132 and the front surface of the tubular portion 61 without forming the partition wall 152. Also the partition walls 153 to 159 are similar in situation. Because a hole or a concavity part is formed between each of the partition walls 152 to 159 and the front surface of the tubular portion 61 as described above, the large weight saving of the stay supports 53 can be performed.

Incidentally, a partition wall may be formed between the connection portion 131 and the front surface of the tubular portion 61, and the hole 151 may be blockaded.

The connection portion 140 is not separated from the front surface of the tubular portion 61, and is convexly provided on the front surface of the tubular portion 61. Incidentally, the connection portions 131 to 139 may be not separated from the front surface of the tubular portion 61 similarly to the connection portion 140, and the connection portions 131 to 139 may be convexly provided on the front surface of the tubular portion 61.

Figure 13:
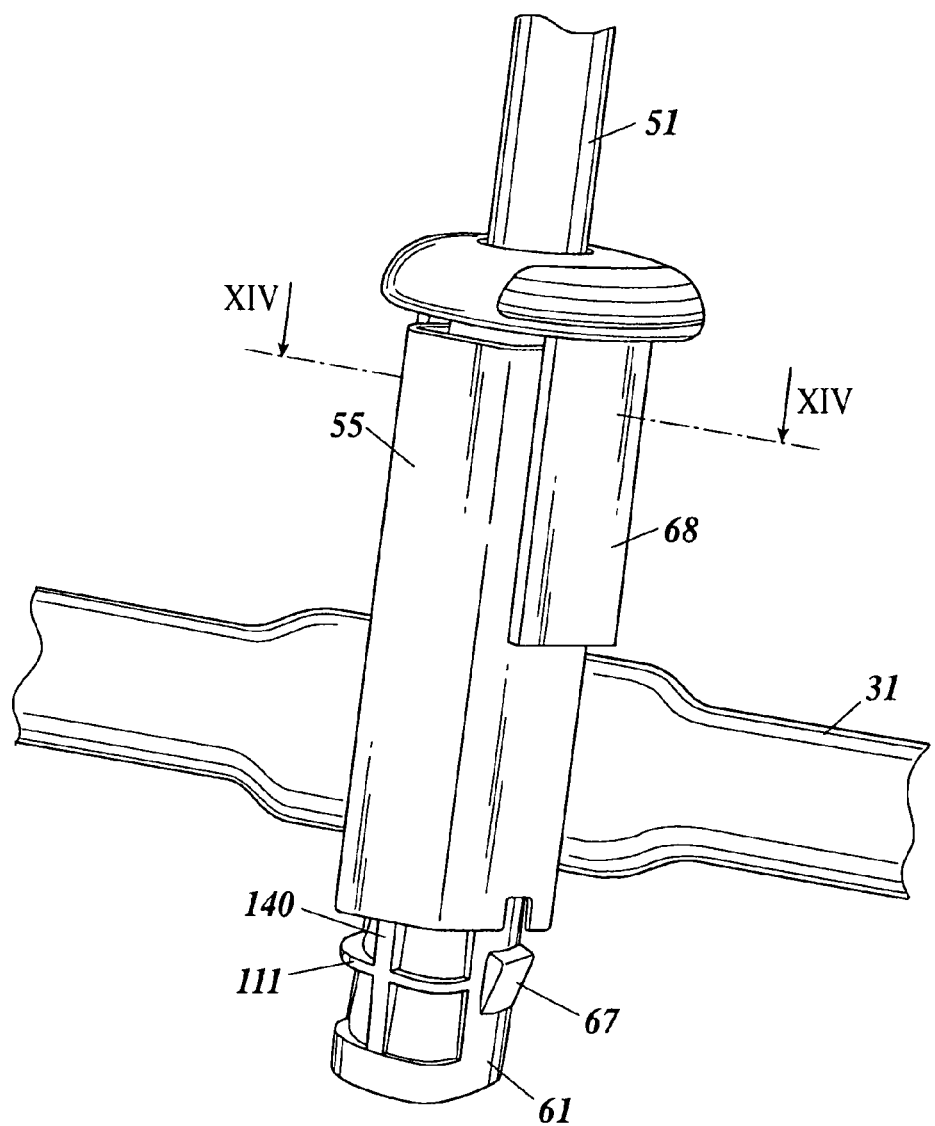
FIG. 13 This is a perspective view of the support structure for the headrest in the same embodiment.
Figure 14:
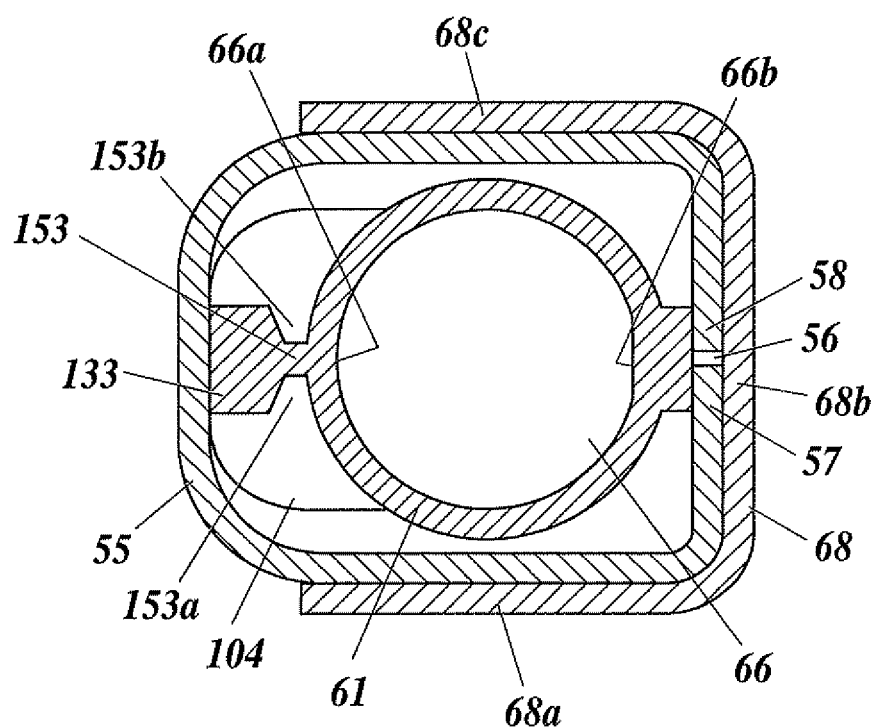
FIG. 14 This is a sectional view of the stay support and the bracket along the line XIV-XIV shown in FIG. 13 as viewed from the direction of the arrows in the same embodiment.

As shown in FIGS. 13 and 14, the tubular portion 61 of the stay support 53 is fit into the bracket 55 from the upper part of the bracket 55, and the projection portions 101 to 110 and the connection portions 131 to 139 face the inner surface of the bracket 55. The projection portions 101 to 110 and the connection portions 131 to 139 are contacted to the inner surface of the bracket 55 with pressure. Because the connection portions 131 to 140 are located between the projection portions 101 to 111, it is possible to prevent the generation of large bend portions in the projection portions 101 to 111 at the time of inserting the tubular portion 61 into the bracket 55.

Because the front end surfaces of the connection portions 131 to 140 and the front end surfaces of the projection portions 101 to 111 are made to be equally flush with one another, the projection portions 101-111 and the connection portions 131-140 abut on the flat inner surface of the bracket 55. The assembly of the stay support 53 and the bracket 55 is consequently good, and the tubular portion 61 is prevented from being unsteady to the bracket 55.

The outer diameter of the head 62 is larger than that of the tubular portion 61, and the head 62 is caught by the upper end of the bracket 55. In the state in which the head 62 is caught by the upper end of the bracket 55, the projection portions 101 to 104 are positioned in the upper part of the bracket 55; the projection portions 109 and 110 are positioned in the lower part of the bracket 551; and the projection portions 105 to 108 are positioned in the middle part in the up-and-down direction of the brackets 55.

The width in the right-and-left direction of the grip portion 68, that is, the interval between the wall part 68a and the wall part 68c is wider than the width in the right-and-left direction of the bracket 55. Then, the bracket 55 is inserted into the gap 79 between the tubular portion 61 and the grip portion 68, and the bracket 55 is grasped by the grip portion 68 from the right and left side surfaces thereof to the back surface thereof.

Then, the bracket 55 is sandwiched between the wall parts 68a and 68c of the grip portion 68. Consequently, the bracket 55 is hard to be enlarged in the diameter thereof even though the tubular portion 61 is inserted into the bracket 55, and the bracket 55 is hard to be widened in the slit 56 thereof.

As shown in FIGS. 1 and 3, the tubular portion 61 is arranged in the inner part of the backrest 3, and the upper part of the head 62 is exposed on the upper end surface of the backrest 3 in the state in which the tubular portion 61 is fit in the bracket 55. Moreover, the grip portion 68 is inserted into the inner part of the backrest 3 from the upper end surface of the backrest 3. Even if the upper end surface is downward pushed into the backrest 3 on the circumference of the head 62, the grip portion 68 is exposed, and the bracket 55 is not consequently exposed.

As shown in FIG. 3, the stay 51 is inserted into the insertion hole 66 of the stay support 53. The stay 51 curves in an arch so that the front side wall surface 66a of the insertion hole 66 follows the line 66c drawn in the longitudinal cross section, and the center of the curvature of the stay 51 exists on the front side of the stay 51. The stay 51 is made by curving the straight circular pipe. Incidentally, although the stay 51 is shaped in a pipe, the stay 51 may be a column without including any cavities.

Because the stay 51 is curved and the insertion hole 66 is formed in the shape mentioned above, the stay 51 is supported at three points. That is, as shown in FIG. 10, the stay 51 contacts with the front side wall surface 66a of the insertion hole 66 with pressure in the upper part of the insertion hole 66 (part shown by α); the stay 51 contacts with the rear side wall surface 66b of the insertion hole 66 with pressure in a part lower than the upper part (part shown by β); and the stay 51 contacts with the front side wall surface 66a of the insertion hole 66 with pressure in a part further lower than the above part (part shown by γ).

Because the stay 51 is supported at three points, the stay 51 does not become unsteady, and the position of the headrest 4 is firmly fixed. In particular, when the back part of the head of an occupant reclines on the headrest 4, the stay 51 is restricted, and the headrest 4 does not become unsteady and is fixed. Because the stay 51 does not become unsteady, the noise owing to vibrations is also suppressed to be the minimum.

The stay 51 is supported at the three positions, and the lowermost part (shown by γ) among the three positions corresponds to the middle part in the up-and-down direction of the tubular portion 61. The load applied from the stay 51 to the tubular portion 61 becomes the maximum at the part shown by γ. On the other hand, the projection portions 105 to 108 and the connection portions 135 to 137 are formed in the middle part in the up-and-down direction (part shown by γ) on the front surface of the tubular portion 61. Even if a large load is applied to the tubular portion 61 in the part shown by γ, the tubular portion 61 is consequently reinforced by the projection portions 105 to 108 and the connection portions 135 to 137, and it is possible to suppress the deformation of the tubular portion 61. In particular, the intervals between the adjacent projection portions 105 to 108 are narrower than those between the adjacent projection portions 101 to 104 and the adjacent projection portions 109-111 located, and the projection portions 105 to 108 are crowded in the part shown by γ. It is consequently able to suppress the deformation of the tubular portion 61 efficiently.

Moreover, the stay 51 is supported in the part lower than that shown by β, and it is concretely supported by the following configuration. As shown in FIGS. 10 and 12, an opening 69 is formed on the back surface of the tubular portion 61 of the stay support 53, and the opening 69 penetrates to the rear side wall surface 66b of the insertion hole 66. The position where the opening 69 penetrates is a position between the lower end and the upper end of the back surface of the stay support 53, and the position is concretely the middle part of the stay support 53 in the up-and-down direction. Moreover, the position of the opening 69 in the up-and-down direction and the positions of the projection portions 106 and 107 in the up-and-down direction correspond to each other and are the same. Even if the opening 69 is formed on the back surface of the tubular portion 61, the lowering of the rigidity of the tubular portion 61 can be suppressed by forming the projection portions 106 and 107 on the front surface of the tubular portion 61.

A pushing piece 70 is provided on the back surface of the tubular portion 61 of the stay support 53. The lower end of the pushing piece 70 is connected to the tubular portion 61 at the lower part of the opening 69. The pushing piece 70 is made to be able to rise and fall around a connection portion 71 to the tubular portion 61. To put it concretely, the pushing piece 70 and the tubular portion 61 are integrally molded with a synthetic resin, and the connection portion 71 of the pushing piece 70 with the tubular portion 61 is made to be soft. The pushing piece 70 is consequently able to rise and fall vertically around the connection portion 71 to the tubular portion 61. Incidentally, the pushing piece 70 may be molded separately from the tubular portion 61, and the pushing piece 70 may be connected to the tubular portion 61 with a pin or the like by a hinge connection at the lower part of the opening 69.

The pushing piece 70 deviates from the opening 69 in the state in which the pushing piece 70 falls backward. On the other hand, the pushing piece 70 enter the opening 69 in the state in which the pushing piece 70 rises, and a part of the pushing piece 70 projects into the insertion hole 66. Here, as shown in FIG. 3, when the tubular portion 61 fits in the bracket 55 of the stay support 53, the back surface of the pushing piece 70 abuts on the inner surface on the rear side of the bracket 55, the rising state of the pushing piece 70 is kept. In particular, because the lower end of the pushing piece 70 joined to the tubular portion 61 at the lower part of the opening 69, the pushing piece 70 hits the upper end of the bracket 55 when the tubular portion 61 is inserted into the brackets 55 from above. When the tubular portion 61 is furthermore inserted, the pushing piece 70 gradually rises by the bracket 55, and the pushing piece 70 is gradually inserted into the bracket 55 together with the tubular portion 61. The pushing piece 70 is thus inserted into the opening 69, and the pushing piece 70 projects into the opening 69.

When the stay 51 is inserted into the insertion hole 66 in the state in which the tubular portion 61 of the stay support 53 is inserted into the brackets 55 in this manner, the stay 51 is pressed forward by the pushing piece 70, and the stay 51 is consequently supported by the pushing piece 70 at a part lower than the part shown by β (see FIG. 10). That is, because the pushing piece 70 abuts on the inner surface of the rear side of the bracket 55, the pushing piece 70 is contacted with the stay 51 with pressure by the reaction force thereof.

Moreover, when the vertical position of the headrest 4 is adjusted, the stay 51 can easily be moved in the direction of pulling out the stay 51 or the direction of inserting into the stay 51 by pulling the headrest 4 upward or pressing the headrest 4 downward. That is, the position of the headrest 4 can be adjusted with a weak force only by seizing the headrest 4 to move the headrest 4 along the curved shape of the stay 51. Furthermore, even if the headrest 4 is released after determining the position of the headrest 4, the position of the headrest 4 is firmly fixed. By this way, the coexistence of both the operability and the prevention of being unsteady can be achieved.

When the lower end of the stays 51 is situated at a position upper than the part shown by γ by adjusting the vertical position of the headrest 4, then the stay 51 cannot be supported at three positions. Consequently, the uppermost position at which the stay 51 can be supported without being unsteady is the case where the lower end of the stay 51 is situated at the part shown by γ.

Moreover, the hitting state of the stay 51 and the rear side wall surface 66b of the insertion hole 66 can easily be adjusted only by finely adjusting the curved shape of the stay 51 or the rear side wall surface 66b of the insertion hole 66, and the prevention of being unsteady and the operability can be made in the optimum state.

As described above, in the aforesaid embodiment, the stay 51 is supported by the parts shown by α, β, and γ in FIG. 10 and by the pushing piece 70, and consequently the stay 51 does not become unsteady and the position of the headrest 4 is firmly fixed. In particular, when the back part of the head of an occupant is reclined on the headrest 4, the stay 51 is restricted, and the headrest 4 is fixed without becoming unsteady. Because the stay 51 does not become unsteady, the noise owing to vibrations is also suppressed to the minimum.

Moreover, a load is applied to the tubular portion 61 from the stay 51 by the support of the stay 51 by the tubular portion 61. Even so, because the projection portions 101 to 111 are formed on the front surface of the tubular portion 61, the rigidity of the tubular portion 61 is improved, and it is consequently difficult for the tubular portion 61 to deform. The stay 51 can thus be supported securely. A large load is applied to the tubular portion 61 from the stay 51 particularly at the part shown by γ in FIG. 10. However, the plurality of projection portions 105 to 108 are crowded at that part. The deformation of the tubular portion 61 can consequently be suppressed efficiently.

Moreover, also the rigidities of the projection portions 101 to 111 can be improved by the connection portions 131 to 140 in addition to the improvement of the rigidity of the tubular portion 61.

Moreover, because the improvement of the rigidity of the tubular portion 61 is achieved not by forming the tubular portion 61 to be simply thick, but by forming the projection portions 101 to 111, the connection portions 131 to 140, and the partition walls 152 to 159 on the front surface side of the tubular portion 61, the increase of the raw material in quantity at the time of molding the stay support 53 can be suppressed.

Moreover, when the vertical position of the headrest 4 is adjusted, the stay 51 can simply be moved in the direction of pulling out the stay 51 or in the direction of inserting the stay 51 by pulling the headrest 4 upward or pressing the headrest 4 downward. That is, the position of the headrest 4 can be adjusted with a weak force only by seizing the headrest 4 to move the headrest along the curved shape of the stay 51. Furthermore, even if the headrest 4 is released after the determination of the position of the headrest 4, the position of the headrest 4 is firmly fixed. The coexistence of the operability and the prevention of being unsteady can be achieved in this way.

Moreover, the hitting state of the stay 51 and the rear side wall surface 66b of the insertion hole 66 can easily be adjusted only by finely adjusting the curved shape of the stay 51 or the rear side wall surface 66b of the insertion hole 66, and the prevention of becoming unsteady and the operability can be made to be the optimum state.

Moreover, because the bracket 55 is made by bending, the slit 56 is formed on the back surface of the bracket 55. Because such a bracket 55 is grasped by the grip portion 68, the bracket 55 is hard to be deformed to open the slit 56, and the stay support 53 does not become unsteady. It is consequently unnecessary to perform welding of the both end portions 57 and 58 of the metal plate for embedding the slit 56, and it is unnecessary to make the bracket 55 itself of a high strength material that is hard to be deformed. The reduction of the manufacturing cost and the manufacturing processes of the bracket 55 can consequently be achieved.

Moreover, even though the upper end surface of the backrest 3 is pushed downward, the grip portion 68 is exposed. However, the metal-made bracket 55 is not exposed nor is seen. The design performance of the vehicle seat 1 is also improved.

Incidentally, although the projection portions 101 to 111 and the connection portions 131 to 140 are provided on the front surface of the tubular portion 61, they may be provided on the left side surface of the tubular portion 61, on the right side surface thereof, or the rear surface thereof. When the projection portions 101 to 111 and the connection portions 131 to 140 are provided on the left side surface of the tubular portion 61, the opening 69 is formed on the right side surface of the tubular portion 61. When the projection portions 101 to 111 and the connection portions 131 to 140 are provided on the right side surface of the tubular portion 61, the opening 69 is formed on the left side surface of the tubular portion 61. When the projection portions 101 to 111 and the connection portions 131 to 140 are provided on the rear surface of the tubular portion 61, the opening 69 is formed on the front surface of the tubular portion 61.

In the following, the other embodiments will be explained. In the following other embodiments, added or changed positions to the first embodiment will mainly be explained. Moreover, in the following other embodiments, the constituent elements corresponding to those of the first embodiment are denoted by the same reference numerals as those of the first embodiment. Then, the explanations of the parts provided similarly to those of the first embodiment will be omitted.

Second Embodiment

Figure 15:
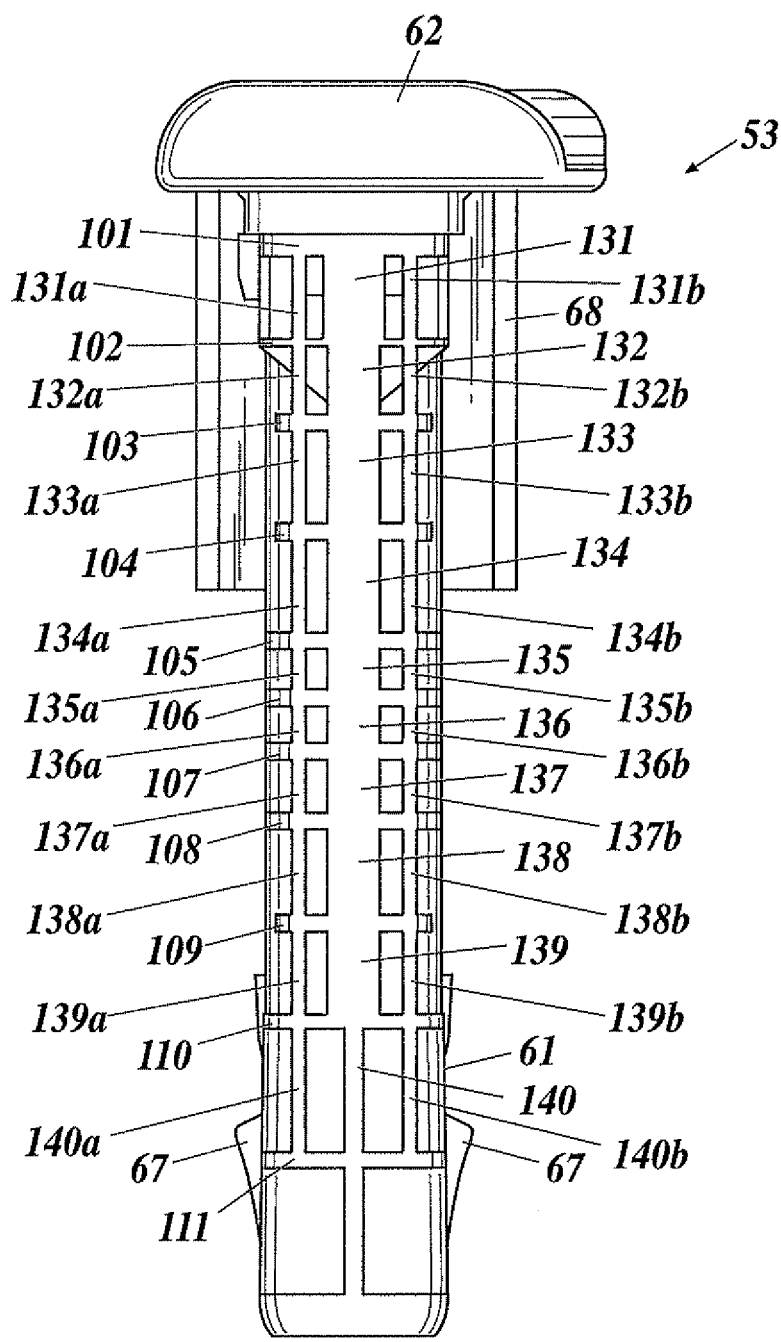
FIG. 15 This is a front view of the stay support in a second embodiment.

As shown in FIG. 15, connection portions 131a and 131b are located between the projection portions 101 and 102 in addition to the connection portion 131.

Connection portions 132a and 132b are similarly located between the projection portions 102 and 103; connection portions 133a and 133b are located between the projection portions 103 and 104; connection portions 134a and 134b are located between the projection portions 104 and 105; connection portions 135a and 135b are located between the projection portions 105 and 106; connection portions 136a and 136b are located between the projection portions 106 and 107; connection portions 137a and 137b are located between the projection portions 107 and 108; connection portions 138a and 138b are located between the projection portions 108 and 109; connection portions 139a and 139b are located between the projection portions 109 and 110; and connection portions 140a and 140b are located between the projection portions 110 and 111. The connection portions 131a to 140a range in the up-and-down direction so as to form a belt shape. The connection portions 131b to 140b range in the up-and-down direction so as to be a belt shape.

Because the connection portions 131a to 140a and 131b to 140b are provided in addition to the connection portions 131 to 140 in this manner, the rigidity of the projection portions 101 to 111 can further be improved.

The position of the opening 69 in the up-and-down direction, which is formed on the rear surface of the tubular portion 61 is the same as that of the projection portion 106 in the up-and-down direction. Even if the opening 69 is formed in the tubular portion 61, the lowering of the rigidity of the tubular portion can consequently be suppressed by the projection portion 106.

Third Embodiment

Figure 16:
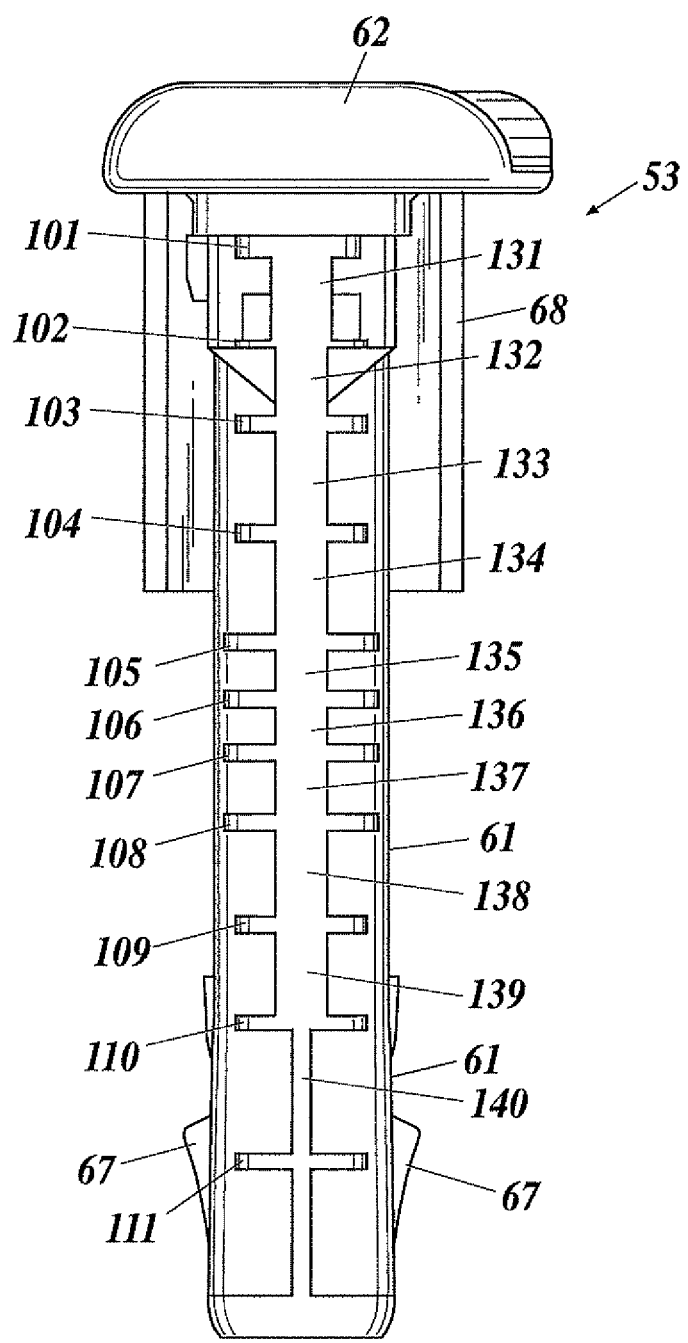
FIG. 16 This is a front view of the stay support in a third embodiment.

As shown in FIG. 16, the projection portions 105 to 108 arranged in the middle part in the up-and-down direction of the tubular portion 61 are wider in the right-and-left direction than the projection portions 101 to 104 arranged in the upper part of the tubular portion 61. The projection portions 105 to 108 arranged in the middle part in the up-and-down direction of the tubular portion 61 are wider in the right-and-left direction than the projection portions 109 to 111 arranged in the lower part of the tubular portion 61.

A large load is applied the tubular portion 61 from the stay 51 in the part shown by γ of FIG. 10, and the projection portions 105 to 108 in that part are longer in the right-and-left direction than the other projection portions 101 to 104 and 109 to 111. The deformation of the tubular portion 61 can consequently be suppressed efficiently.

Fourth Embodiment

Figure 17:
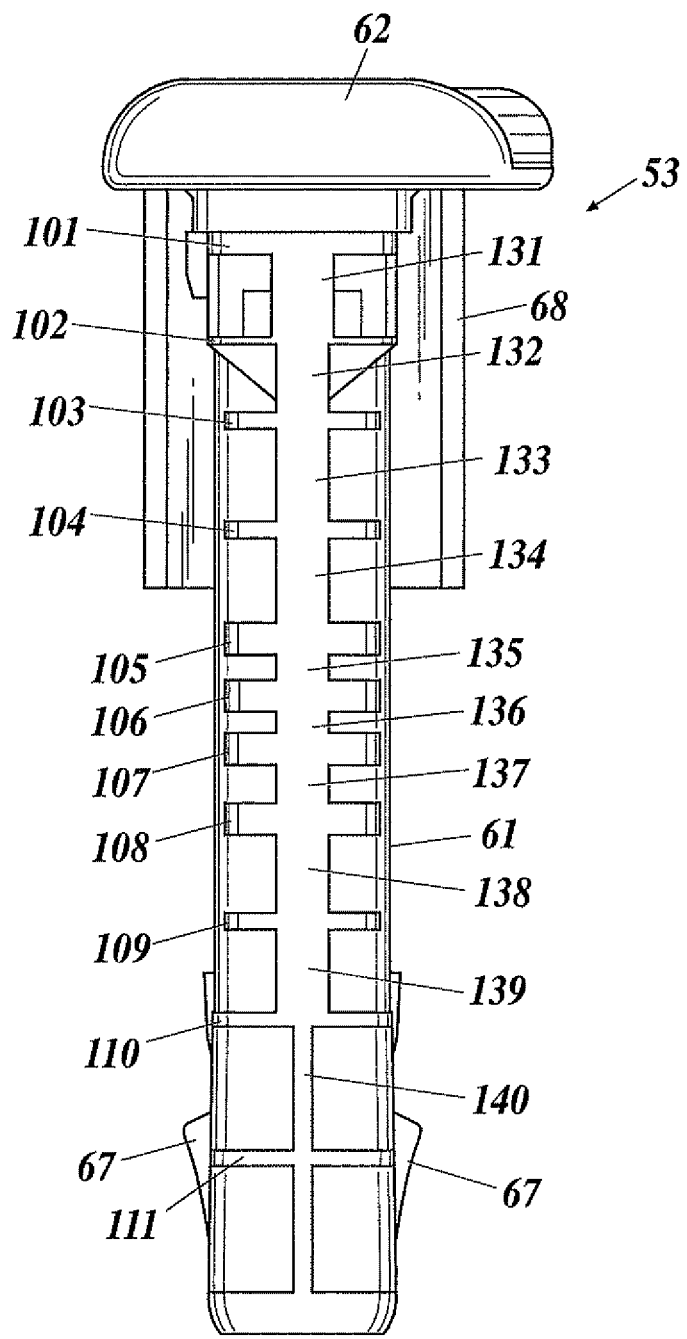
FIG. 17 This is a front view of the stay support in a fourth embodiment.

As shown in FIG. 17, the projection portions 105 to 108 arranged in the middle part in the up-and-down direction of the tubular portion 61 are thicker in the up-and-down direction than the projection portions 101 to 104 arranged in the upper part of the tubular portion 61. The projection portions 105 to 108 arranged in the middle part in the up-and-down direction of the tubular portion 61 are thicker in the up-and-down direction than the projection portions 109 to 111 arranged in the lower part of the tubular portion 61.

A large load is applied to the middle part in the up-and-down direction of the tubular portion 61 from the stay 51, and the projection portions 105 to 108 in that part are thicker in the up-and-down direction than the other projection portions 101 to 104 and 109 to 111. The deformation of the tubular portion 61 can consequently be suppressed efficiently.

Fifth Embodiment

Figure 18:
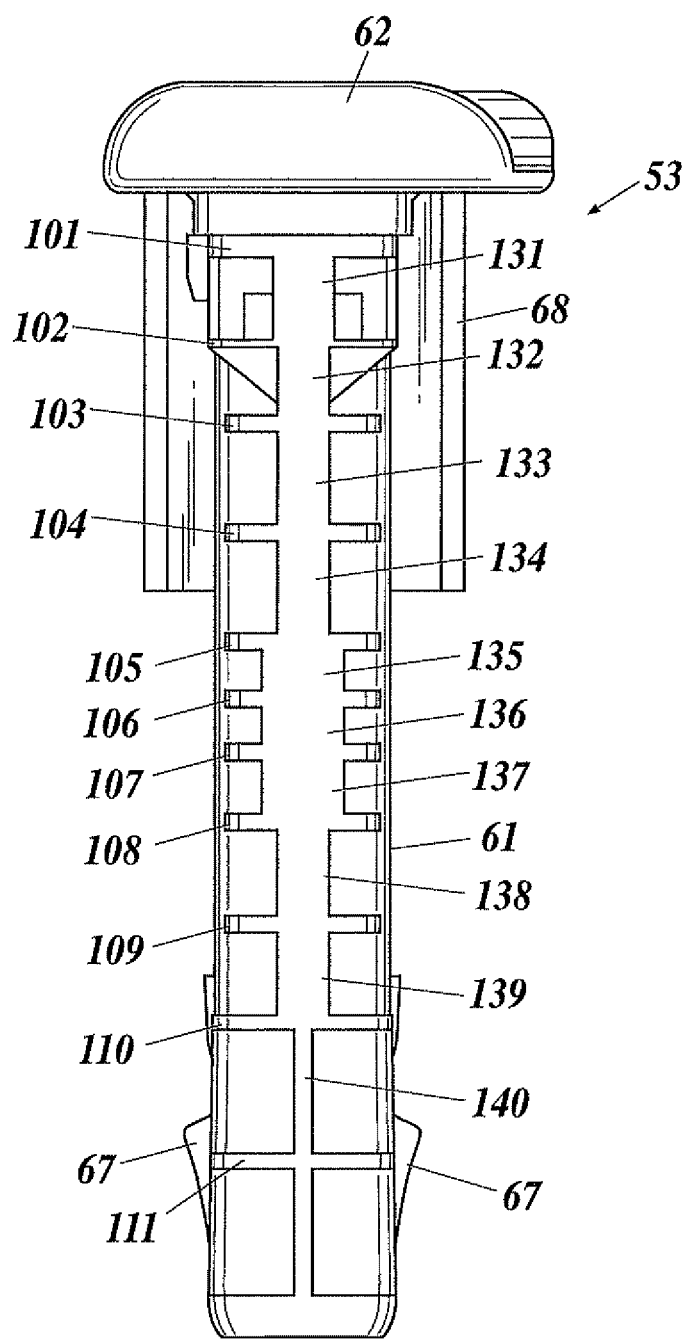
FIG. 18 This is a front view of the stay support in a fifth embodiment.

As shown in FIG. 18, the connection portions 135 to 137 are wider in the right-and-left direction than the connection portions 131 to 134 and 138 to 140. Thereby, the deformation of the tubular portion 61 can be suppressed efficiently.

Sixth Embodiment

Figure 19:
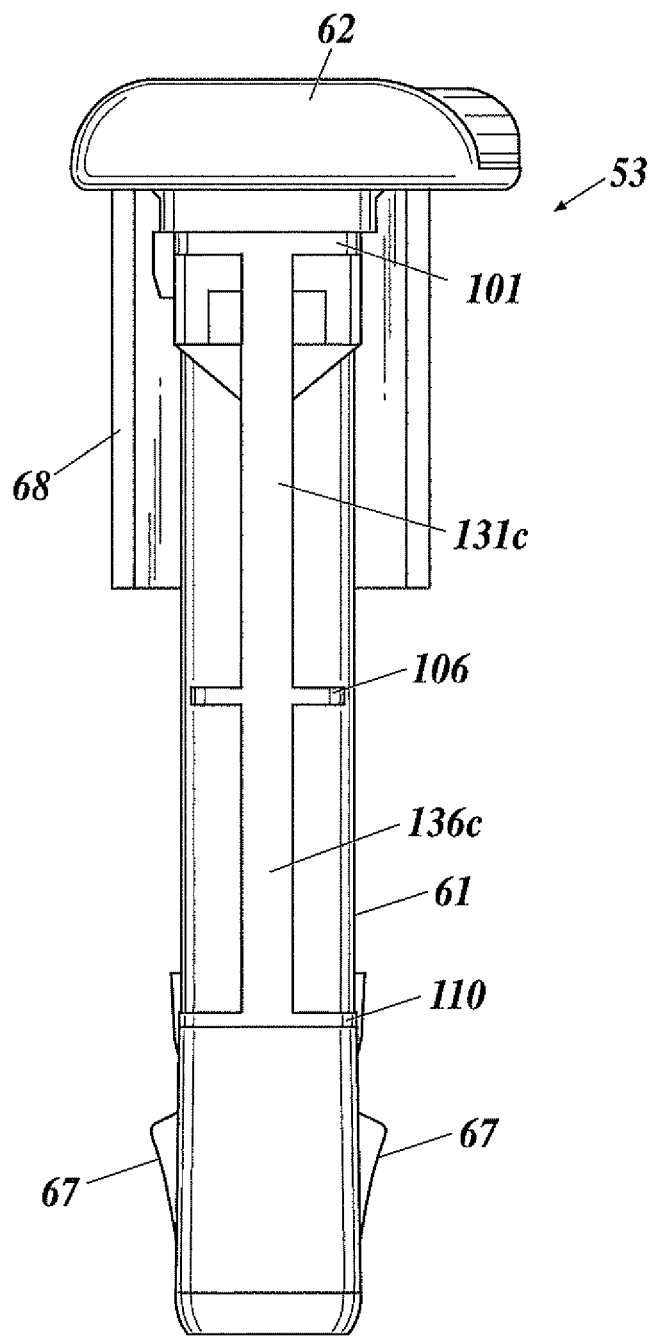
FIG. 19 This is a front view of the stay support in a sixth embodiment.

As shown in FIG. 19, the projection portion 101 is formed in the upper part of the tubular portion 61; the projection portion 106 is formed in the middle part in the up-and-down direction of the tubular portion 61; the projection portion 110 is formed in the lower part of the tubular portion 61; and the projection portions 102 to 105, 107 to 109 and 111 are not formed. The connection portion 131c is located between the projection portions 101 and 106, and the connection portion 136c is located between the projection portions 106 and 110. These connection portions 131c and 136c range in the up-and-down direction so as to form a belt shape. The connection portions 131c and 136c may project from the front surface of the tubular portion 61, or the connection portions 131c and 136c may be separated from the front surface of the tubular portion 61. When the connection portions 131c and 136c are separated from the front surface of the tubular portion 61, a hole may be formed between the connection portions 131c and 136c and the front surface of the tubular portion 61, or a partition wall may be formed therebetween to form concavity parts on both sides of the partition wall. Moreover, the front end surface of the connection portion 131c and the front end surface of the connection portion 136c, and the front surface of the projection portion 101, the front surface of the projection portion 106, and the front surface of the projection portion 110 may be flush with one another.

Seventh Embodiment

Figure 20:
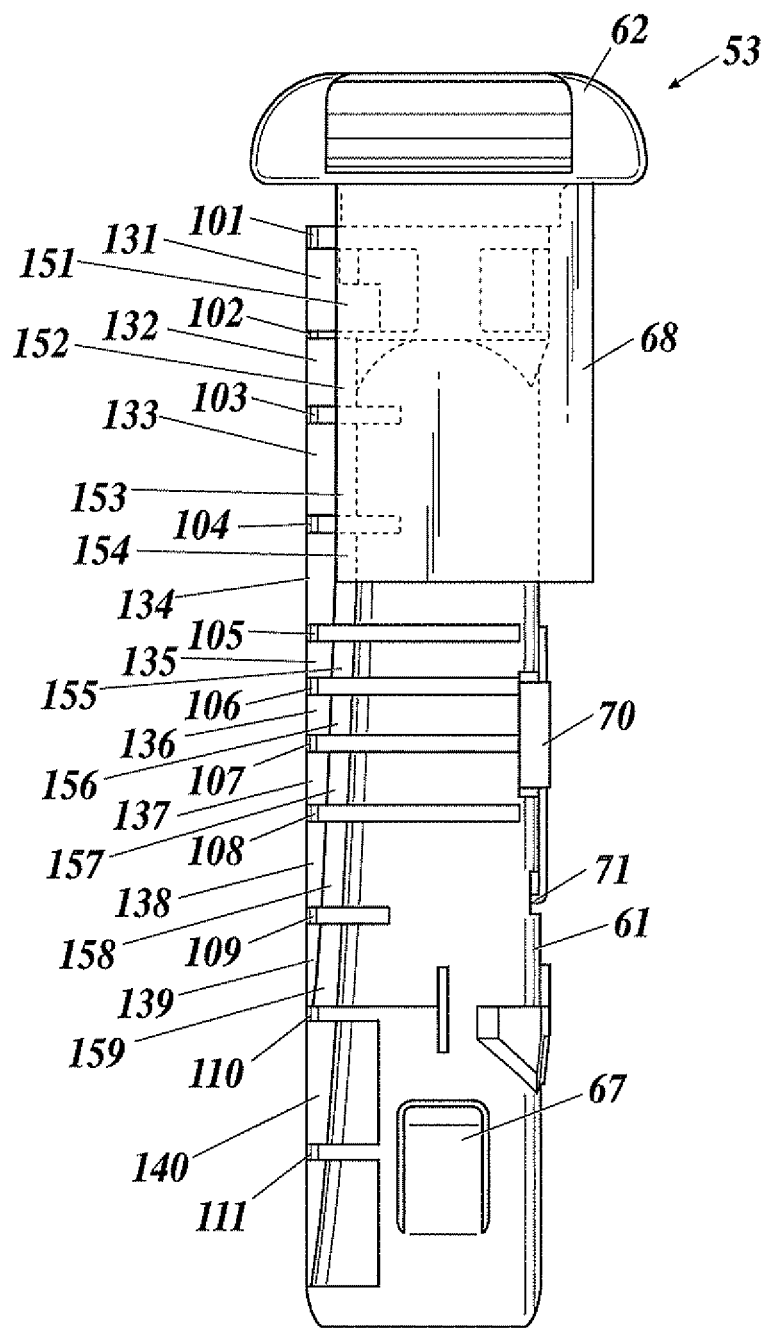
FIG. 20 This is a front view of the stay support in a seventh embodiment.

As shown in FIG. 20, the projection portions 105 to 108 arranged in the middle part in the up-and-down direction of the tubular portion 61 are formed in a range from the front surface of the tubular portion 61 to the rear surface thereof through the both sides thereof. In particular, the projection portions 106 and 107 are formed to the edge of the opening 69. Even if the opening 69 is formed in the tubular portion 61, the tubular portion 61 can be reinforced by the projection portions 106 and 107. The deformation of the tubular portion 61 can hereby be suppressed.

Moreover, when a convex portion projects from the inner surface or the rear surface of the tubular portion 61 and is formed along the edge of the opening 69 to enclose the opening 69, the rigidity of the tubular portion 61 is improved, and furthermore the rigidity of the tubular portion 61 is further improved when the projection portions 106 and 107 join the convex portion.

The projection portions 105 to 108 may be formed in a range from the front surface of the tubular portion 61 to the rear surface thereof through the both sides thereof, and the projection portions 106 and 107 may be formed to the edge of the opening 69 as shown in FIG. 20 even in the cases of the second embodiment (FIG. 15), the third embodiment (FIG. 16), the fourth embodiment (FIG. 17), and the fifth embodiment (FIG. 18).

Moreover, the projection portion 106 may be formed in a range from the front surface of the tubular portion 61 to the edge of the opening 69 through both the sides of the tubular portion 61 even in the case of the sixth embodiment (FIG. 19).

Eighth Embodiment

Figure 21:
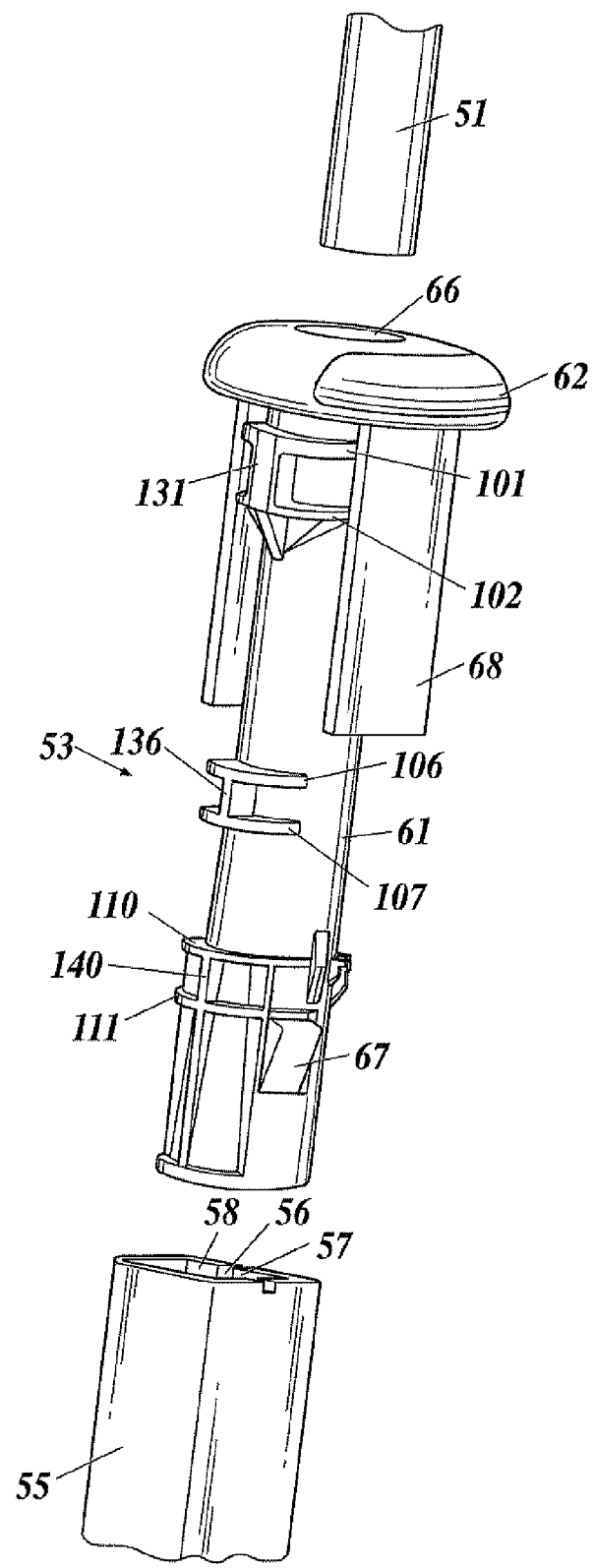
FIG. 21 This is a front view of the stay support in an eighth embodiment.

As shown in FIG. 21, the projection portions 101 and 102 are formed in the upper part of the tubular portion 61; the projection portions 106 and 107 are formed in the middle part in the up-and-down direction of the tubular portion 61; the projection portions 110 and 111 are formed in the lower part of the tubular portion 61; and the projection portions 103 to 105 and 108 to 109 are not formed. The connection portion 131 is located between the projection portions 101 and 106; the connection portion 136 is located between the projection portions 106 and 107; and the connection portion 140 is located between the projection portions 110 and 111. On the other hand, no connection portions are located between the projection portions 102 and 106, and between the projection portions 106 and 110.

Ninth Embodiment

Figure 22:
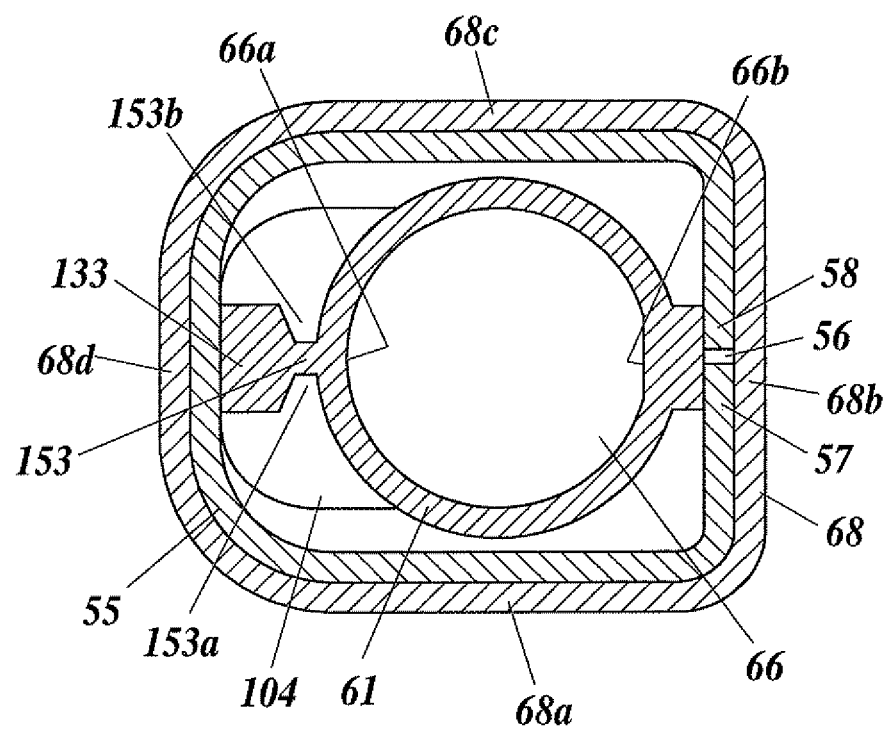
FIG. 22 This is a cross sectional view of the stay support and the bracket along the line XIV-XIV shown in FIG. 13 as viewed from the direction of the arrows in a ninth embodiment.

As shown in FIG. 22, the grip portion 68 may be a rectangular tube. That is, the grip portion 68 includes a front wall part 68*d* ranging from the front ends of the side wall parts 68*a* and 68*c* in addition to the wall parts 68*a*, 68*b*, and 68*c*. In this case, the width in the front-and-rear direction of the grip portion 68 is larger than that of the bracket 55, and the width in the right-and-left direction of the grip portion 68 is larger than that of the bracket 55. The bracket 55 is inserted into the grip portion 68. Even in this case, it is difficult for the bracket 55 to be deformed so that the slit 56 is opened, and even if the upper end surface of the backrest 3 is pushed down at the front side of the head 62, the front surface of the bracket 55 is not exposed.

Tenth Embodiment

The grip portion 68 does not include the rear wall part 68*a* and the front wall part 68*d*, but may include only the side wall parts 68*a* and 68*c*. That is, the bracket 55 may be sandwiched by the grip portion 68 in the width direction of the slit 56.

Eleventh Embodiment

A lock mechanism for locking the stay 51 or releasing the lock thereof may be provided to the stay support 53 (particularly to the head 62).

Twelfth Embodiment

Figure 23:
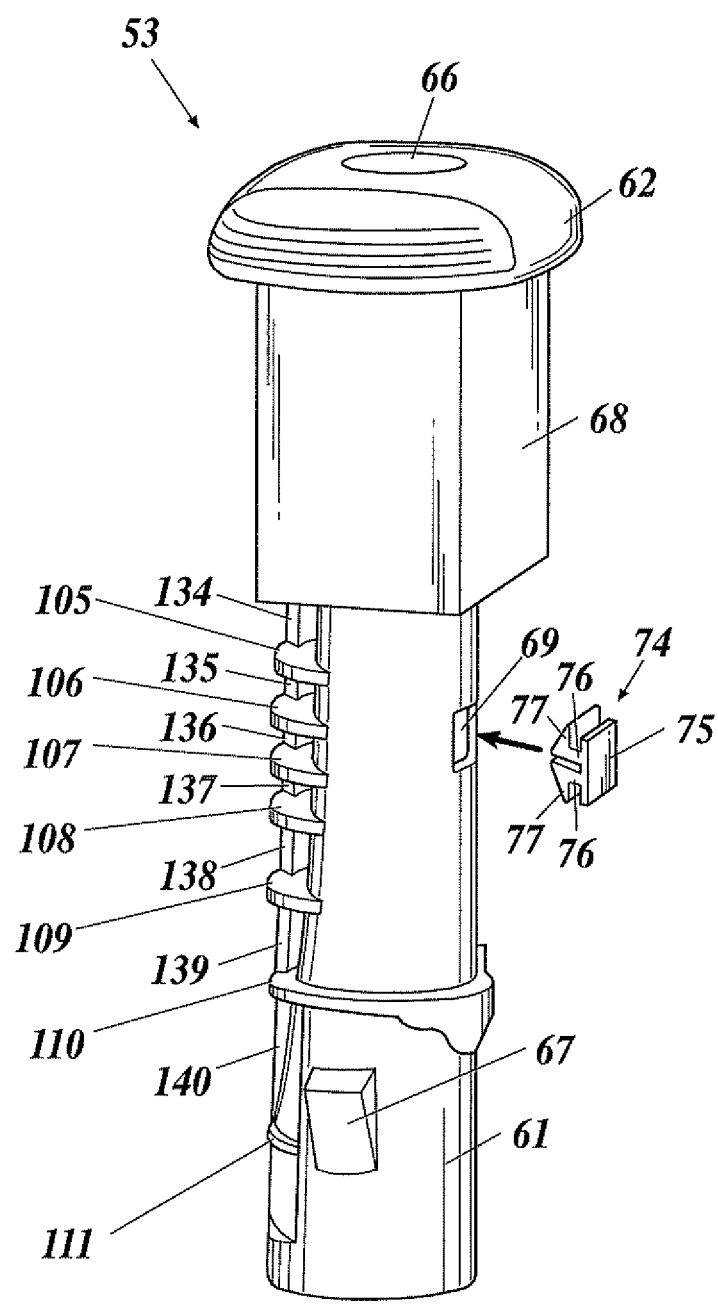
FIG. 23 This is a perspective view of the stay support in a twelfth embodiment.

As shown in FIG. 23, a pushing piece 74 to be inserted into the opening 69 may be shaped as shown in FIG. 23. The pushing piece 74 includes a plate-like section 75, a pair of elastic legs 76 provided to stand on the one surface of the plate-like section 75, and pawls 77 provided on the apical ends of the elastic legs 76. The pushing piece 74 is fit into the opening 69 from the back of the stay support 53 by inserting the pushing piece 74 from the apical ends of the elastic legs 76. Then, the pawls 77 of the pushing piece 74 are caught by the inner surface of the stay supports 53, and the plate-like section 75 is caught by the back surface of the stay support 53. The pushing piece 74 is hereby fixed to the tubular portion 61 of the stay support 53. The apical ends of the pushing piece 74, that is, the apical ends of the elastic legs 76 project into the opening 69. When the stay 51 is inserted into the insertion hole 66 of the stay support 53, the stay 51 is pressed forward by the pushing piece 74. Here, because the pushing piece 74 is fixed to the stay support 53, the pushing piece 74 contacts with the stay 51 with pressure by a reaction force therefrom. The stay 51 does not consequently become unsteady.

Incidentally, the pushing piece 74 may be used in place of the pushing piece 70 also in the first to eleventh embodiments.

Thirteenth Embodiment

Figure 24:
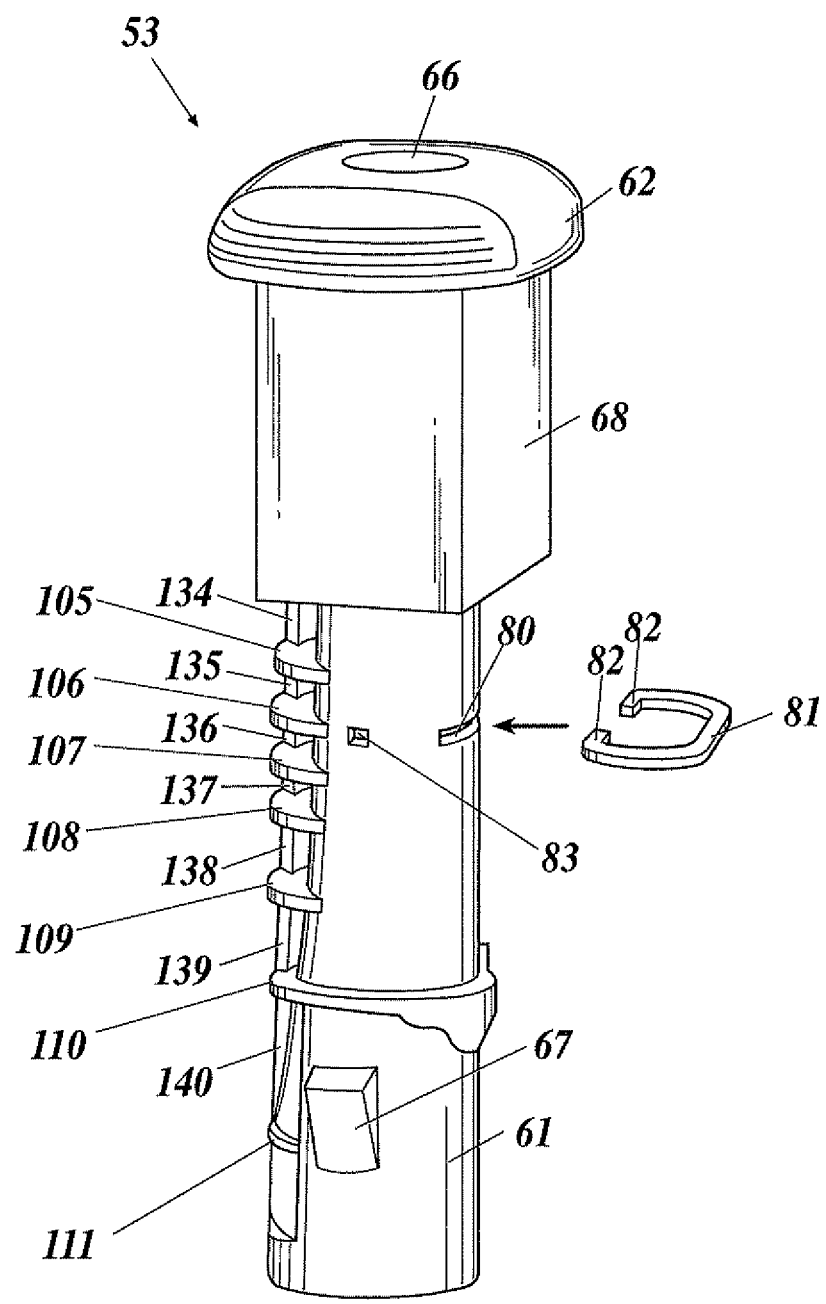
FIG. 24 This is a perspective view of the stay support in a thirteenth embodiment.

As shown in FIG. 24, a slit 80 which is elongated in the right-and-left direction is formed on the back surface of the tubular portion 61 in place of the opening 69. The slit 80 penetrates to the inner surface of the stay support 53. Moreover, a seizing hole 83 is formed on the tubular portion 61 at the same height position as the slit 80. On the other hand, a pushing piece 81 formed in a C-shape embraces the tubular portion 61 from the back thereof, and both of the apical end portions 82 of the pushing piece 81 are caught by the seizing hole 83. A part of the pushing piece 81 is fit into the slit 80 to project into the insertion hole 66. The pushing piece 81 is hereby fixed to the tubular portion 61. When the stay 51 is inserted into the insertion hole 66 of the stay support 53, the stay 51 is pressed forward by the pushing piece 81. Here, because the pushing piece 81 is fixed to the stay support 53, the rear part of the pushing piece 81 consequently contacts to the stay 51 with pressure by the reaction force therefrom. The stay 51 does not thus become unsteady.

Incidentally, the pushing piece 81 may be used also in the second to eleventh embodiments in place of the pushing piece 70.

Fourteenth Embodiment

Figure 25:
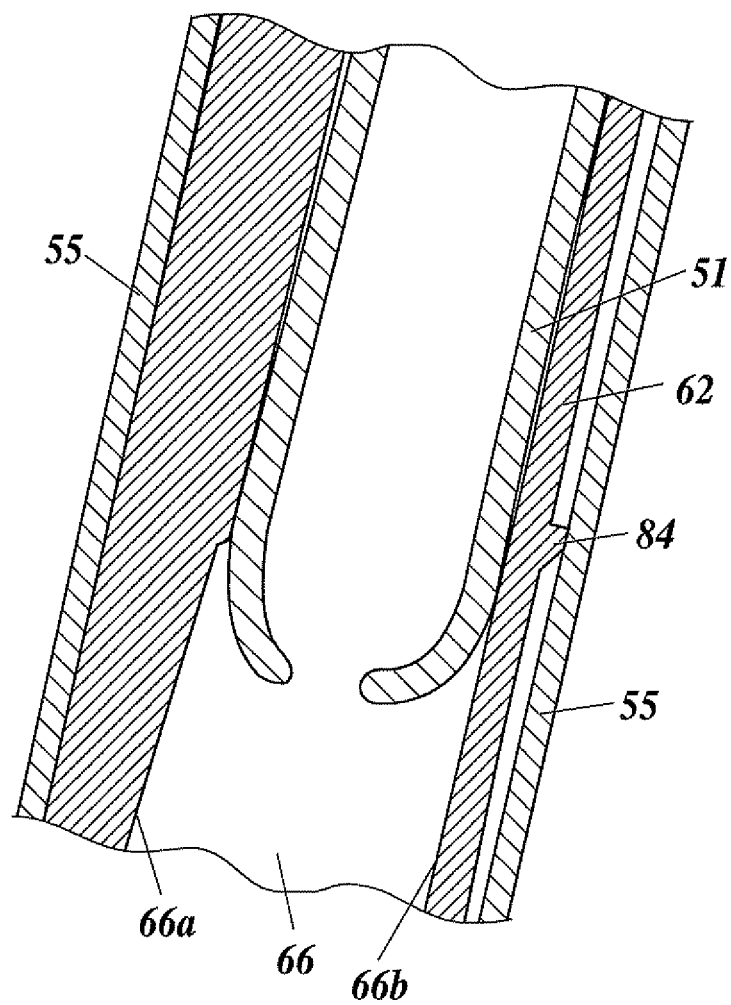
FIG. 25 This is a longitudinal cross sectional view of the stay support and the bracket along the line X-X shown in FIG. 8 as viewed from the direction of the arrows in a fourteenth embodiment.

As shown in FIG. 25, a projection 84 as an insert material projects from the rear surface of the tubular portion 61. The position at which the projection 84 is formed is between the lower end and the upper end of the back surface of the stay support 53. To put it concretely, the position is the middle part in the up-and-down direction of the stay support 53. In particular, as in the aforesaid embodiment, the opening 69 is not formed on the rear surface of the tubular portion 61 but the projection 84 is formed at the position where the opening 69 is formed in the other embodiments. The projection 84 is a rib provided perpendicularly to the rear surface of the tubular portion 61. The projection 84 and the tubular portion 61 are integrally molded with a synthetic resin. Incidentally, the projection 84 may be separately molded from the tubular portion 61 to be attached to the tubular portion 61 after the molding thereof.

In the state in which the tubular portion 61 of the stay support 53 is fit in the bracket 55, the projection 84 contacts with the inner surface on the rear side of the bracket 55 with pressure, and the rear side wall surface 66*b* of the insertion hole 66 of the stay support 53 is deformed by the reaction force therefrom. That is, the rear side wall surface 66*b* of the insertion hole 66 curves in an arch so as to be convex toward the inner side of the insertion hole 66. The stay 51 consequently contacts with the rear side wall surface 66*b* of the insertion hole 66 with pressure not only in the part shown by β (see FIG. 10) but also in the part lower than that part.

Figure 26:
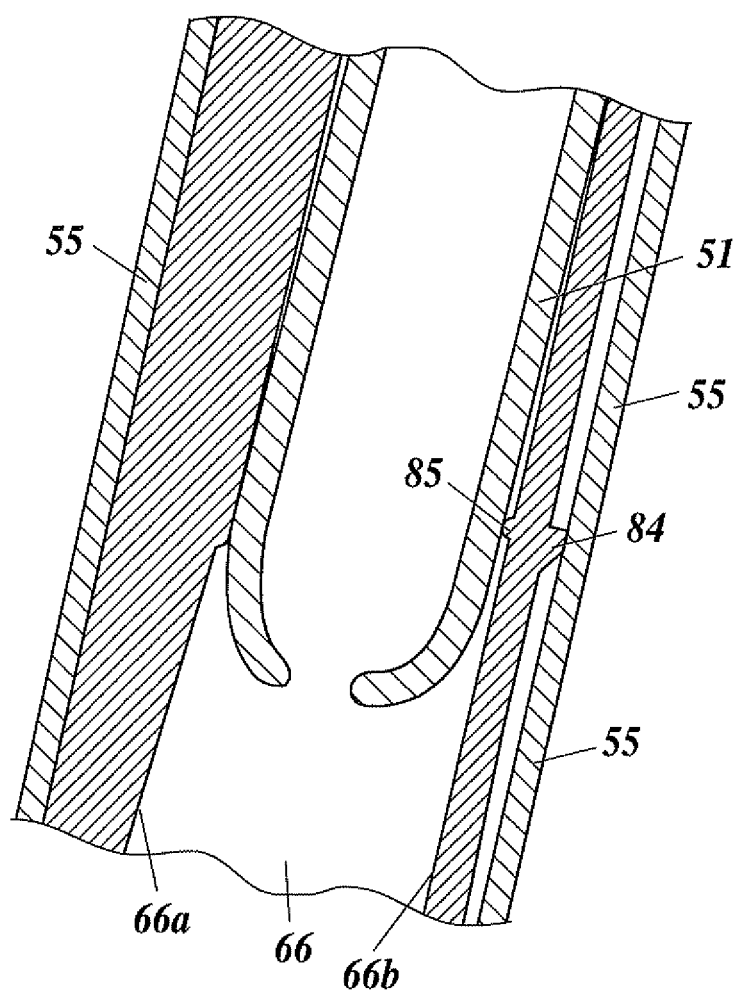
FIG. 26 This is a longitudinal cross sectional view of the stay support and the bracket along the line X-X shown in FIG. 8 as viewed from the direction of the arrows in a modified example.

As shown in FIG. 26, a projection 85 as an insert material may be formed on the tubular portion 61 in addition to the projection 84. The projection 85 is formed on the rear side wall surface 66*b* of the insertion hole 66. The vertical position of the projection 85 is at the same as that of the projection 84, and the projection 85 is provided on the opposite side of the projection 84. By providing the projection 85, the projection 85 contacts with the stay 51 with pressure when the rear side wall surface 66*b* of the insertion hole 66 is deformed by the projection 84. It is hereby possible to prevent the headrest 4 from becoming unsteady furthermore effectively. Moreover, by adjusting the vertical position of the projection 85, the operation load, the unsteadiness, and the noise at the time of adjusting the vertical position of the headrest 4 can be finely adjusted.

Incidentally, the embodiments to which the present invention can be applied are not limited to those described above, but the embodiments can suitably be changed without departing from the gist and the scope of the present invention.

For example, although the case where the seat according to the present invention is applied to the vehicle seat of a motorcar in each of the embodiments described above, the present invention may be applied to the seats of the other vehicles (such as an airplane and a vessel). Moreover, the seat according to the present invention may be used for something other than the vehicles. Moreover, it is not necessary that the grip portion 68 is provided in any embodiments described above.

The preferable embodiments of the present invention have been described above.

Accordingly, in order to simplify the position adjustment of a headrest and to make it possible to fix the position of the headrest firmly, a headrest support structure comprises a stay (51) extending from a headrest (4), a stay support (53) having an insertion hole (66) in which the stay is inserted and being provided to a backrest (3), wherein a line (66c) of a front side wall surface (66a) of the insertion hole in a longitudinal cross section curves around the front side of the insertion hole, and the radius of curvature of a line of a rear side wall surface of the insertion hole in the longitudinal cross section is larger than the radius of curvature of the line (66d) of the front side wall surface (66c) of the insertion hole. Thereby, the function and the effect that the stay extending from the headrest contacts with the front side wall surface of the insertion hole and the rear side wall surface thereof with pressure to hereby enable the stay to be fixed can be obtained. On the other hand, when the headrest is seized to move the stay and the headrest according to the shape of the stay or the shape of the front side wall surface of the insertion hole, the position adjustment of the headrest can easily be performed without applying a large force thereto.

Moreover, a headrest support structure comprises a stay (51) extending from a headrest, a stay support (53) having an insertion hole in which the stay is inserted and an opening (69) penetrating from a back surface to the insertion hole, and being provided to a backrest (3), and a pushing piece (70, 73, 74, 81) fit into the opening (69) to project into the insertion hole, wherein a line (66c) of a front side wall surface (66a) of the insertion hole in a longitudinal cross section curves around the front side of the insertion hole, and the radius of curvature of a line (66d) of a rear side wall surface (66b) of the insertion hole in the longitudinal cross section is larger than the radius of curvature of the line (66d) of the front side wall surface of the insertion hole to make the pushing piece abut on the stay. Thereby, the function and the effect that the stay extending from the headrest contacts with the front side wall surface of the insertion hole and the rear side wall surface thereof with pressure to hereby enable the stay to be fixed can be obtained. In particular, the opening penetrates from the back surface of the stay support to the insertion hole, and a pushing piece is fit into a through-hole. Because the pushing piece projects into the insertion hole and the stay abuts on the pushing piece, the support of the headrest can be stabilized. On the other hand, when the headrest is seized to move the stay and the headrest according to the shape of the stay or the shape of the front side wall surface of the insertion hole, the position adjustment of the headrest can easily be performed without applying a large force thereto.

Moreover, a headrest support structure comprises a stay (51) extending from a headrest (4), a bracket (55) provided to a backrest (3), a stay support (53) having an insertion hole (66) in which the stay is inserted, and being fit into the bracket, and an insertion material (84) sandwiched between the back surface of the stay support and the inner surface of the bracket, wherein a line (66c) of a front side wall surface (66a) of the insertion hole in a longitudinal cross section curves around the front side of the insertion hole, and the radius of curvature of a line (66d) of a rear side wall surface (66b) of the insertion hole in the longitudinal cross section is larger than the radius of curvature of the line of the front side wall surface of the insertion hole. The insertion material contacts with the inner surface of the bracket with pressure, and the rear side wall surface of the insertion hole contacts to the stay with pressure by the reaction force therefrom. Thereby, the function and the effect that the stay extending from the headrest contacts with the front side wall surface of the insertion hole and the rear side wall surface thereof with pressure to hereby enable the stay to be fixed can be obtained. In particular, because the rear side wall surface of the insertion hole contacts with the stay with pressure in a wide range by an insert material between the back surface of the stay support and the inner surface of the bracket, the support of the headrest can be stabilized. On the other hand, when the headrest is seized to move the stay and the headrest according to the shape of the stay or the shape of the front side wall surface of the insertion hole, the position adjustment of the headrest can easily be performed without applying a large force thereto.

Moreover, in order to suppress the deformation of a bracket, a headrest support structure comprises a stay (51) extending downward from a headrest (4), a bracket (55) made by winding a plate material in a tube shape to extend vertically in a backrest, and a stay support (53), wherein the stay support includes a head (62), a tubular portion (61) suspending from the head, and a grip portion (58) suspending from the head on the circumference of the tubular portion. Furthermore, an insertion hole is formed over a range from the head to the tubular portion, and the stay is inserted into the insertion hole. The tubular portion is fit into the bracket, and the bracket is grasped by the grip portion. Because the bracket is grasped by the grip portion, the diameter of the bracket wound in a tube shape is not enlarged, and the function and effect that the stay support does not become unsteady can be obtained.

The entire disclosure of Japanese Patent Application No. 2008-004554, filed on Jan. 11, 2008, including the description, the claims, the drawing, and the abstract thereof, is incorporated herein by reference in their entirety, as long as the domestic laws of the designated countries designated by the present international application or the elected countries permit the above incorporation.

Although various typical embodiments have been shown and explained, the present invention is not limited to those embodiments. Consequently, the scope of the present invention is limited only by the claims.

INDUSTRIAL APPLICABILITY

The headrest support structure according to the present invention can be applicable to seats each equipped with a headrest.

The invention claimed is:
1. A headrest support structure, comprising:
a stay extending downward from a headrest in use;
a bracket configured to be coupled to a backrest so as to be formed in a tubular shape, and extending in an upward-downward direction in use;
a tubular portion having an insertion hole in which the stay is inserted, the tubular portion being fitted into the bracket, and extending in an upward-downward direction in use;
a first projection portion projecting from an outer peripheral surface of an upper part of the tubular portion, and facing to an inner surface of the bracket;
a second projection portion projecting from the outer peripheral surface of a middle part in a longitudinal direction of the tubular portion, and facing to the inner surface of the bracket;
a third projection portion projecting from the outer peripheral surface of a lower part of the tubular portion, and facing to the inner surface of the bracket;
a first connection portion located between the first projection portion and the second projection portion, the first connection portion being configured to contact and connect the first projection portion and the second projection portion; and a second connection portion located between the second projection portion and the third projection portion, the second connection portion being configured to contact and connect the second projection portion and the third projection portion, wherein the first and second connection portions project outwardly from the outer peripheral surface of the tubular portion.

2. The headrest support structure as claimed in claim 1, wherein a hole or a concavity part is formed between at least one of the first and second connection portions and the outer peripheral surface of the tubular portion.

3. The headrest support structure as claimed in claim 1, wherein the projection portions and at least one of the first and second connection portions are provided to be flush with each other.

4. The headrest support structure as claimed in claim 1, wherein
an opening is formed in the tubular portion on an opposite side of the projection portions, and the projection portions are formed to an edge of the opening along the outer peripheral surface of the tubular portion.

5. The headrest support structure as claimed in claim 1, wherein the projection portions are provided so as to form a fin shape.

6. The headrest support structure as claimed in claim 1,
wherein a dimension of the first connection portion in the longitudinal direction exceeds a dimension of the first projection portion or of the second projection portion in the longitudinal direction, and
wherein a dimension of the second connection portion in the longitudinal direction exceeds a dimension of the second projection portion or of the third projection portion in the longitudinal direction.

7. The headrest support structure as claimed in claim 1,
wherein the first connection portion spans a distance between the first projection portion and the second projection portion in the longitudinal direction, and
wherein the second connection portion spans a distance between the second projection portion and the third projection portion in the longitudinal direction.

8. A headrest support structure, comprising:
a stay extending downward from a headrest in use;
a bracket configured to be coupled to a backrest so as to be formed in a tubular shape, and extending in an upward-downward direction in use;
a tubular portion having an insertion hole in which the stay is inserted, the tubular portion being fitted into the bracket, and extending in an upward-downward direction in use;
a first projection portion projecting from an outer peripheral surface of the tubular portion, and facing to an inner surface of the bracket;
a second projection portion projecting from the outer peripheral surface of the tubular portion and provided lower than the first projection portion, the second projection portion facing to the inner surface of the bracket; and
a connection portion located between the first projection portion and the second projection portion, the connection portion being configured to contact and connect the first projection portion and the second projection portion,
wherein the connection portion projects outwardly in a direction away from the outer peripheral surface of the tubular portion, and wherein a partition wall having a dimension in a tangential direction of the tubular portion less than that of the connection portion connects the connection portion to the outer peripheral surface of the tubular portion.

9. The headrest support structure as claimed in claim 8, further comprising:
a second connection portion located between the first projection portion and the second projection portion, and arranged to a left side of the connection portion; and
a third connection portion located between the first projection portion and the second projection portion, and arranged to a right side of the connection portion.

10. The headrest support structure as claimed in claim 8, wherein a dimension of the connection portion in a longitudinal direction of the tubular portion exceeds a dimension of the first projection portion or of the second projection portion in the longitudinal direction.

11. The headrest support structure as claimed in claim 8, wherein the connection portion spans a distance between the first projection portion and the second projection portion in a longitudinal direction of the tubular portion.

12. The headrest support structure as claimed in claim 8, wherein a dimension of the connection portion in a circumferential direction of the tubular portion exceeds a dimension of at least one of the first projection portion and the second projection portion in a longitudinal direction of the tubular portion.

13. A headrest support structure, comprising:
a stay extending downward from a headrest in use;
a bracket configured to be coupled to a backrest so as to be formed in a tubular shape, and extending in an upward-downward direction in use;
a tubular portion having an insertion hole in which the stay is inserted, the tubular portion being fitted into the bracket, and extending in an upward-downward direction in use;
a projection portion projecting from an outer peripheral surface of an upper part of the tubular portion, and facing to an inner surface of the bracket; and
a connection portion located immediately adjacent to the projection portion, the connection portion projecting outwardly from the outer peripheral surface of the tubular portion, wherein
an opening is formed in the tubular portion on an opposite side of the projection portion, and
a position in a longitudinal direction of the projection portion corresponds to a position in the longitudinal direction of the opening.

14. The headrest support structure as claimed in claim 13, further comprising a pushing portion which is fit into the opening and which pushes the stay forward.

15. A headrest support structure, comprising:
a stay extending downward from a headrest in use;
a bracket configured to be coupled to a backrest so as to be formed in a tubular shape, and extending in an upward-downward direction in use;
a tubular portion having an insertion hole in which the stay is inserted, the tubular portion being fitted into the bracket, and extending in an upward-downward direction in use; and
a plurality of projection portions projecting from an outer peripheral surface of the tubular portion so as to arrange the projection portions in a longitudinal direction, and facing to an inner surface of the bracket, wherein
an interval between adjacent projection portions arranged at a middle part in the longitudinal direction of the tubular portion among the plurality of projection portions is smaller than an interval between other adjacent projection portions.

16. The headrest support structure as claimed in claim 15, further comprising:

a plurality of connection portions located between the plurality of projection portions.

17. The headrest support structure as claimed in claim 16, wherein a connection portion arranged at a middle part in the longitudinal direction of the tubular portion among the plurality of connection portions is wider in a transverse direction than another connection portion.

* * * * *